United States Patent
Nehring et al.

(10) Patent No.: US 9,536,331 B2
(45) Date of Patent: ***Jan. 3, 2017

(54) METHODS AND APPARATUS FOR DATA VISUALIZATION OF HIERARCHICAL DATA STRUCTURES

(71) Applicant: TECHNOMICS, INC., Arlington, VA (US)

(72) Inventors: Robert Kenneth Nehring, Arlington, VA (US); Katharine Alexandra Mann, Arlington, VA (US); Robert Raymond Jones, Reston, VA (US)

(73) Assignee: TECHNOMICS, INC., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/989,546

(22) Filed: Jan. 6, 2016

(65) Prior Publication Data

US 2016/0196673 A1    Jul. 7, 2016

Related U.S. Application Data

(63) Continuation of application No. 13/852,714, filed on Mar. 28, 2013, now Pat. No. 9,256,971.

(60) Provisional application No. 61/616,748, filed on Mar. 28, 2012.

(51) Int. Cl.
*G06T 11/20* (2006.01)
*G06T 19/20* (2011.01)
*G06T 15/00* (2011.01)
*G06T 11/60* (2006.01)

(52) U.S. Cl.
CPC .............. *G06T 11/206* (2013.01); *G06T 11/60* (2013.01); *G06T 15/00* (2013.01); *G06T 19/20* (2013.01)

(58) Field of Classification Search
None
See application file for complete search history.

(56) References Cited

U.S. PATENT DOCUMENTS

| | | | |
|---|---|---|---|
| 2002/0113816 A1* | 8/2002 | Mitchell | G06F 3/0481 715/734 |
| 2009/0265380 A1* | 10/2009 | Wright | G06F 17/30011 |
| 2011/0179370 A1* | 7/2011 | Cardno | G06T 11/206 715/771 |

* cited by examiner

*Primary Examiner* — Maurice L McDowell, Jr.
*Assistant Examiner* — Donna J Ricks
(74) *Attorney, Agent, or Firm* — Arent Fox LLP

(57) ABSTRACT

Methods and apparatuses for creating an output graphic using a processing device may include receiving one or more elements of a hierarchical data structure, wherein each of the one or more elements includes a value. In addition, the methods and apparatuses may include calculating a total value for the hierarchical data structure by adding the value from the one or more elements and creating relationships that associate the one more elements with the total value. The methods and apparatuses may also include generating a diagram to illustrate the total value and the relationships among the one or more elements and the total value and transmitting the diagram for presentation on a display.

19 Claims, 44 Drawing Sheets

| Surface Combatant | FY10$M |
|---|---|
| | $2,000 |

| | FY10$M | % of Total |
|---|---|---|
| Plan Cost | $85 | 4.3% |
| Basic Construction/Conversion | $743 | 37.2% |
| Change Orders | $37 | 1.9% |
| Electronics | $200 | 10.0% |
| HM&E | $123 | 6.1% |
| Other Cost | $63 | 3.2% |
| Ordnance | $748 | 37.4% |

| | FY10$M | % of Category |
|---|---|---|
| Labor | $379.16 | 51.0% |
| Material | $252.77 | 34.0% |
| FCCM | $14.87 | 2.0% |
| Fee | $96.65 | 13.0% |

| | FY10$M | % of Category |
|---|---|---|
| SQQ 89 ASW | $50.34 | 25.2% |
| SLQ-32 EW/MK 53 Nulka | $10.16 | 5.1% |
| USQ 82 GEDMS | $15.62 | 7.8% |
| EXCOMM | $47.58 | 23.8% |
| Navigation System | $2.17 | 1.1% |
| MK-12 IFF | $4.96 | 2.5% |
| SLQ 25 NIXIE | $2.16 | 1.1% |
| SLQ 4 LAMPS III | $2.45 | 1.2% |
| SSEE | $14.67 | 7.3% |
| MIDS | $3.40 | 1.7% |
| CEC BLK II | $6.77 | 3.4% |
| Misc. Electronics | $39.64 | 19.8% |

| | FY10$M | % of Category |
|---|---|---|
| STC 2 IVCS | $7.03 | 5.7% |
| Main Reduction Gear | $63.05 | 51.3% |
| Machinery Control System | $11.66 | 9.5% |
| Integrated Bridge Navigation System | $9.35 | 7.6% |
| Misc. HM&E | $31.79 | 25.9% |

| | FY10$M | % of Category |
|---|---|---|
| AEGIS Weapon System (MK-7) | $342.62 | 45.8% |
| VLS MK 41 | $84.70 | 11.3% |
| MK 45 LWG | $24.47 | 3.3% |
| MK 37 Tomahawk | $38.85 | 5.2% |
| Phalanx CIWS BLK 1B | $6.05 | 0.8% |
| MK 32 SVTT | $2.35 | 0.3% |
| Electro-optical System | $3.07 | 0.4% |
| MK 160 GFCS | $8.89 | 1.2% |
| SPS 67 Radar | $13.36 | 1.8% |
| Misc. Ordnance | $223.71 | 29.9% |

Fig. 6

| Element | Name | Cost (FY13$M) |
|---|---|---|
| 1.0 | Surface Combatant | $2,000 |
| 1.1 | Plan Cost | $85 |
| 1.2 | Basic Construction/Conversion | $743 |
| 1.2.1 | Labor | $379 |
| 1.2.1.1 | Hull Structure | $61 |
| 1.2.1.2 | Propulsion | $15 |
| 1.2.1.3 | Electric Plant | $27 |
| 1.2.1.4 | Command and Surveillance | $23 |
| 1.2.1.5 | Auxiliary Systems | $45 |
| 1.2.1.6 | Outfits and Furnishing | $49 |
| 1.2.1.7 | Armament | $4 |
| 1.2.1.8 | Integration/Engineering | $87 |
| 1.2.1.9 | Ship Assembly and Support Services | $68 |
| 1.2.2 | Material | $253 |
| 1.2.2.1 | Hull Structure | $20 |
| 1.2.2.2 | Propulsion | $78 |
| 1.2.2.3 | Electric Plant | $28 |
| 1.2.2.4 | Command and Surveillance | $23 |
| 1.2.2.5 | Auxiliary Systems | $53 |
| 1.2.2.6 | Outfits and Furnishing | $15 |
| 1.2.2.7 | Armament | $3 |
| 1.2.2.8 | Integration/Engineering | $8 |
| 1.2.2.9 | Ship Assembly and Support Services | $25 |
| 1.2.3 | FCCM | $15 |
| 1.2.4 | Fee | $97 |
| 1.3 | Change Orders | $37 |
| 1.4 | Electronics | $200 |
| 1.4.1 | SQQ 89 ASW | $50 |
| 1.4.2 | SLQ-32 EW/MK 53 Nulka | $10 |
| 1.4.3 | USQ 82 GEDMS | $16 |
| 1.4.4 | EXCOMM | $48 |
| 1.4.5 | Navigation System | $2 |
| 1.4.6 | MK-12 IFF | $5 |
| 1.4.7 | SLQ 25 NIXIE | $2 |
| 1.4.8 | SLQ 4 LAMPS III | $2 |
| 1.4.9 | SSEE | $15 |
| 1.4.10 | MIDS | $3 |
| 1.4.11 | CEC BLK II | $7 |
| 1.4.12 | Misc. Electronics | $40 |
| 1.5 | HM&E | $123 |
| 1.5.1 | STC 2 IVCS | $7 |
| 1.5.1.1 | Major Hardware | $4 |
| 1.5.1.2 | Spares | $0 |
| 1.5.1.3 | System Engineering | $1 |
| 1.5.1.4 | Technical Engineering Service | $0 |
| 1.5.1.5 | Other Costs | $1 |
| 1.5.2 | Main Reduction Gear | $63 |
| 1.5.2.1 | Major Hardware | $47 |

Fig. 18A

| | | |
|---|---|---|
| 1.5.2.2 | Spares | $3 |
| 1.5.2.3 | System Engineering | $6 |
| 1.5.2.4 | Technical Engineering Service | $4 |
| 1.5.2.5 | Other Costs | $3 |
| 1.5.3 | Machinery Control System | $12 |
| 1.5.4 | Integrated Bridge Navigation System | $9 |
| 1.5.5 | Misc. HM&E | $32 |
| 1.6 | Other Cost | $63 |
| 1.7 | Ordnance | $748 |
| 1.7.1 | AEGIS Weapon System (MK-7) | $343 |
| 1.7.1.2 | Major Hardware | $200 |
| 1.7.1.3 | System Integration | $51 |
| 1.7.1.4 | Logistic Support | $31 |
| 1.7.1.5 | Technical Engineering Services | $15 |
| 1.7.1.6 | Technical Support Services | $0 |
| 1.7.1.7 | System Engineering | $5 |
| 1.7.1.8 | Other | $40 |
| 1.7.2 | VLS MK 41 | $85 |
| 1.7.2.1 | Major Hardware | $57 |
| 1.7.2.2 | Ancillary Equip | $1 |
| 1.7.2.3 | Tech Data/Doc | $0 |
| 1.7.2.4 | Technical Engineering Services | $8 |
| 1.7.2.5 | System engineering | $12 |
| 1.7.2.6 | Other Costs | $5 |
| 1.7.3 | MK 45 LWG | $24 |
| 1.7.3.1 | Major Hardware | $17 |
| 1.7.3.2 | Spares | $1 |
| 1.7.3.3 | System Engineering | $2 |
| 1.7.3.4 | Technical Engineering Service | $1 |
| 1.7.3.5 | Other Costs | $3 |
| 1.7.4 | MK 37 Tomahawk | $39 |
| 1.7.4.1 | Major Hardware | $19 |
| 1.7.4.2 | Spares | $5 |
| 1.7.4.3 | System Engineering | $4 |
| 1.7.4.4 | Technical Engineering Service | $3 |
| 1.7.4.5 | Other Costs | $8 |
| 1.7.5 | Phalanx CIWS BLK 1B | $6 |
| 1.7.5.1 | Major Hardware | $5 |
| 1.7.5.2 | System Engineering | $0 |
| 1.7.5.3 | Technical Engineering Service | $1 |
| 1.7.5.4 | Other Costs | $1 |
| 1.7.6 | MK 32 SVTT | $2 |
| 1.7.7 | Electro-optical System | $3 |
| 1.7.8 | MK 160 GFCS | $9 |
| 1.7.9 | SPS 67 Radar | $13 |
| 1.7.10 | Misc. Ordnance | $224 |

Fig. 18B

METHODS AND APPARATUS FOR DATA VISUALIZATION OF HIERARCHICAL DATA STRUCTURES

RELATED APPLICATIONS

This application is a Continuation of U.S. patent application Ser. No. 13/852,714, filed Mar. 28, 2013, which claims priority to U.S. Provisional Application No. 61/616,748 entitled "Methods and Apparatuses for Data Visualization," filed Mar. 28, 2012. The preceding applications are incorporated by reference in their entirety herein.

FIELD OF INVENTION

Background

The old adage "a picture is worth a thousand words" is one that individuals have all heard and often try to use to their advantage. Graphical display authority Edward Tufte defines graphical excellence as "that which gives the viewer the greatest number of ideas in the shortest time with the least ink in the smallest space" (Tufte, The Visual Display of Quantitative information, 2001). However, in practice, most cost estimators only show data in one of a few chart types that programs such as Microsoft Excel™ can automatically generate. Though these charts have their places and uses, there are myriads of other ways to display data, tell a story, or make decisions.

Pictures, graphs, charts and tables are common throughout analysis and documentation efforts of all sorts, and cost estimates are no exception. In fact, data visualization and new ways to depict data are increasingly important in both the conduct of analysis and its presentation to decision-makers. Many analysts use graphs to better understand their data, display results, and crosscheck findings.

It has been a particular challenge in the related art to display data housed in a hierarchical data structure, such as a Work Breakdown Structure (WBS), as are most cost estimates. The difficulty arises because there are usually varying levels of detail that are related. Analysts often examine elements or levels one at a time. This often leads to "tunnel vision" on a piece of the life cycle cost estimate (LCCE) that may be rather inconsequential in the comprehensive view of the estimate. As such, analysts may spend days discussing parts of an estimate that do not significantly affect the total end cost, which may decrease time that an analyst can spend on value added activities. Though data visualization techniques such as Pie charts and Pareto charts can go a long way in helping an analyst see what is important, it is often easy to focus on one slide while forgetting the rest of the brief or, in other words, to lose sight of the sky when focusing on one star.

Thus, there is an unmet need in the art for, among other things, a visual display of information with varying levels of detail that are related.

SUMMARY

Aspects of the present invention relate to methods and systems for creating and displaying charts that may illustrate an entire hierarchical data structure on a single chart, showing many or all hierarchical data structure elements, relationships, and costs or other data, in a visual manner.

Aspects of the present invention may build upon the strengths of other display techniques to present an accurate and realistic view of the entire hierarchical data structure on a single sheet of paper or screen view. For example, the methods and systems may rely on a carefully sized shapes to represent each hierarchical data structure element, with the shapes connected in a specific galaxy-like pattern to show the hierarchical data structure. Each child element may be "in orbit" around its parent, with its children, i.e., grandchildren, "in orbit" around their parent. The size of each element may be directly proportional to its value and hence importance. For example, when the element upon which an analyst focuses is small and remote like Pluto, an analyst may need to re-focus efforts on the Jupiter and Saturn elements first.

Moreover, aspects of the present invention may provide insights that may be available in a single view with this information-dense chart throughout the life cycle of an estimate. For example, the charts may help understand an estimate and decide where an analyst should focus their time. The charts may also be used to visually compare two alternatives, such as in an Analysis of Alternatives (AoA). In addition, the same chart may show several independent estimates of the same item to allow for a very quick and detailed comparison. Moreover, various Earned Value Management (EVM) metrics placed on a single chart may allow an analyst to discern what hierarchical data structure elements may need the most attention.

As such, the charts may provide insight into any suitable type of data that is stored in a hierarchical data structure. The charts may quickly give an analyst insight into the data that may not have been gained through other graphics or analyses.

Additional advantages and novel features relating to aspects of the present invention will be set forth in part in the description that follows, and in part will become more apparent to those skilled in the art upon examination of the following or upon learning by practice thereof.

DESCRIPTION OF THE FIGURES

In the drawings:

FIG. 6 illustrates an example surface combatant comb chart with the first three hierarchical data structure levels in accordance with an aspect of the present invention;

FIGS. 18A and 18B illustrate surface combatant data in accordance with an aspect of the present invention;

DETAILED DESCRIPTION

Figure 1:
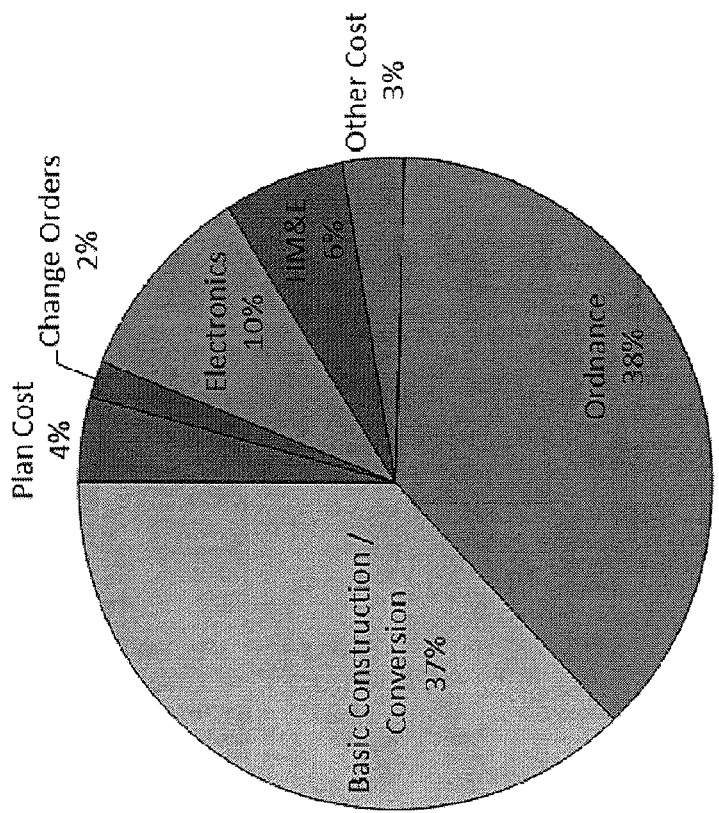
FIG. 1 illustrates an example pie graph of surface combat costs in accordance with an aspect of the present invention.

Aspects of the present invention relate to methods and systems for creating and displaying charts that may illustrate an entire hierarchical data structure on a single sheet of paper or single screen view, for example, showing many or all hierarchical data structure elements, relationships, values or other data, and even methodologies in a visual way. For example, the charts may illustrate any quantifiable measure such as, but not limited to, cost, revenue, donations, people, distance, weight, molecules, wealth, taxes, height, mass, and energy. The methods and systems may rely on a carefully sized shape to represent each hierarchical data structure element, with the shapes connected in a specific galaxy-like pattern to show the hierarchical data structure. Each child element may be "in orbit" around its parent, with its children, i.e., grandchildren, "in orbit" around their parent. The size of each element may be directly proportional to its value and hence importance.

The charts in accordance with aspects of the present invention may be coded to automate the creation and/or relation of the charts, and may allow an analyst or decision maker to put an entire hierarchical data structure on a single sheet of paper or single screen view, for example, where significant elements quickly become clear. Therefore, the charts may help an analyst gain an accurate and comprehensive view of the elements within a hierarchical data structure, discern what elements are important, how elements are related, and where analysis time enjoys the greatest potential payback, for example.

It should be noted that the charts illustrated in the figures of the application use the sample data from Table 1 that contains hierarchical data structure cost data for a follow-ship, Surface Combatant. The table was assembled using cost data from the Department of the Navy Fiscal Year (FY) 2012 Budget Estimates, Shipbuilding and Conversion, Navy, 2011; all of the costs are normalized to fiscal year 2013 millions of dollars, expressed throughout the paper as FY13$M. In addition, expert opinion has been used to allocate to some low-level elements.

TABLE 1

Surface Combatant Hierarchical Data Structure and Cost Data

| Element | Name | Cost (FY13$M) |
|---|---|---|
| 1.0 | Surface Combatant | $2,000 |
| 1.1 | Plan Cost | $85 |
| 1.2 | Basic Construction/Conversion | $743 |
| 1.2.1 | Labor | $379 |
| 1.2.2 | Material | $253 |
| 1.2.3 | FCCM | $15 |
| 1.2.4 | Fee | $97 |
| 1.3 | Change Orders | $37 |
| 1.4 | Electronics | $200 |
| 1.4.1 | SQQ 89 ASW | $50 |
| 1.4.2 | SLQ-32 EW/MK 53 Nulka | $10 |
| 1.4.3 | USQ 82 GEDMS | $16 |
| 1.4.4 | EXCOMM | $48 |
| 1.4.5 | Navigation System | $2 |
| 1.4.6 | MK-12 IFF | $5 |
| 1.4.7 | SLQ 25 NIXIE | $2 |
| 1.4.8 | SLQ 4 LAMPS III | $2 |
| 1.4.9 | SSEE | $15 |
| 1.4.10 | MIDS | $3 |
| 1.4.11 | CEC BLK II | $7 |
| 1.4.12 | Misc. Electronics | $40 |
| 1.5 | HM&E | $123 |
| 1.5.1 | STC 2 IVCS | $7 |
| 1.5.2 | Main Reduction Gear | $63 |
| 1.5.3 | Machinery Control System | $12 |
| 1.5.4 | Integrated Bridge Navigation System | $9 |
| 1.5.5 | Misc. HM&E | $32 |
| 1.6 | Other Cost | $63 |
| 1.7 | Ordnance | $748 |
| 1.7.1 | AEGIS Weapon System (MK-7) | $343 |
| 1.7.2 | VLS MK 41 | $85 |
| 1.7.3 | MK 45 LWG | $24 |
| 1.7.4 | MK 37 Tomahawk | $39 |
| 1.7.5 | Phalanx CIWS BLK 1B | $6 |
| 1.7.6 | MK 32 SVTT | $2 |
| 1.7.7 | Electro-optical System | $3 |
| 1.7.8 | MK 160 GFCS | $9 |
| 1.7.9 | SPS 67 Radar | $13 |
| 1.7.10 | Misc. Ordnance | $224 |

Though a plethora of different visualization charts exist, the most commonly used charts are the ones that Microsoft Excel™ will display by default. Most other types of visualization charts require large amounts of time to create or modify. Despite the number of available charts, when trying to view where the "heavy hitters" or drivers in a hierarchical data structure are, Pie charts and bar charts are two of the most viewed charts in practice. Often, these bar charts come in the form of a Pareto chart. In addition, the Cost Estimating Body of Knowledge (CEBoK) created by the Society of Cost Estimating and Analysis (SCEA) identifies Comb charts as a useful way to view the data (Society of Cost Estimating and Analysis, 2010).

Pie charts are typically very basic. For example, Pie charts may simply include a circle with different colors for the various elements, as displayed in FIG. 1. Each piece's area may be equal to its proportionate percentage of the whole. For example in FIG. 1, Ordnance is 38% of the total, so the Ordnance's area is also 38% of the total. Pie charts may help an analyst see where to focus their efforts.

Figure 2:
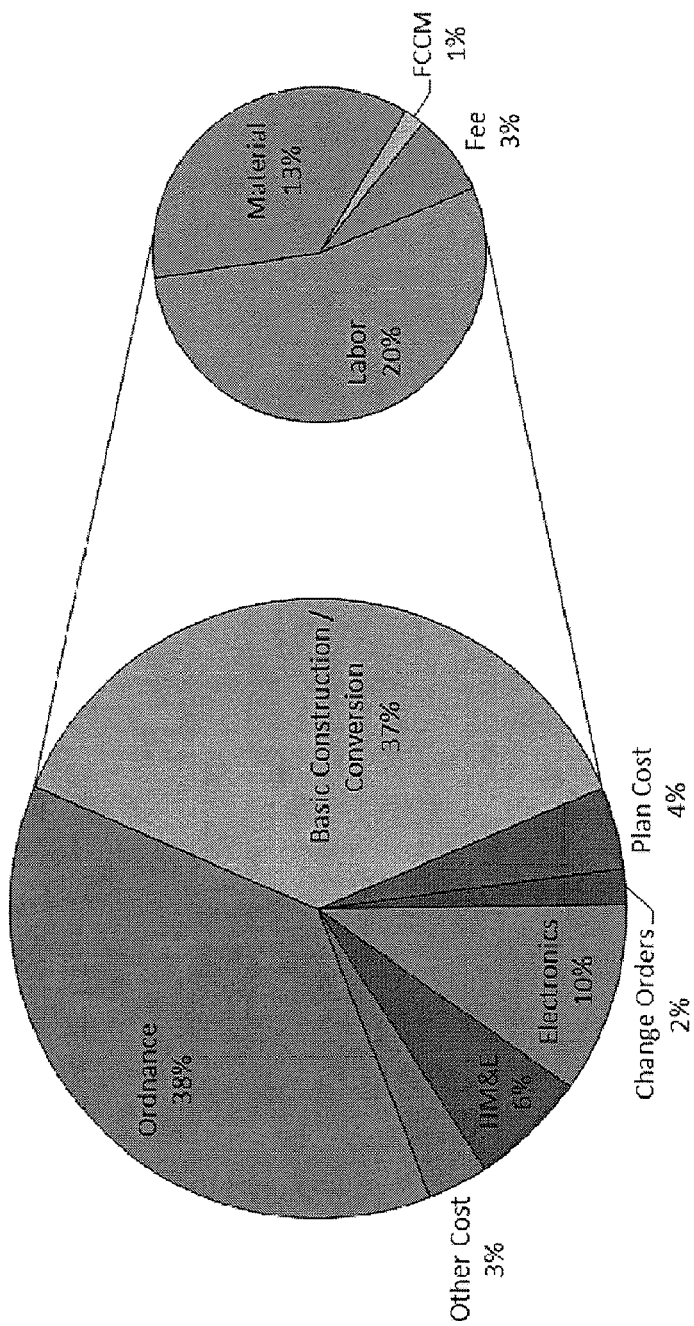
FIG. 2 illustrates an example pie graph of surface combat costs with a basic breakout in accordance with an aspect of the present invention.

One of the problems associated with basic Pie charts is that Pie charts only show the child-level data for a single parent-level element. By connecting several Pie charts using lines, similar to as illustrated in FIG. 2, this problem decreases. While this may be useful for a few levels, connecting several Pie charts together may not tell the entire story. Analysts often only break out the largest pieces into their components, ignoring the smaller pieces and their sub-components. When many levels are illustrated, the display may become convoluted and complicated.

Figure 3:
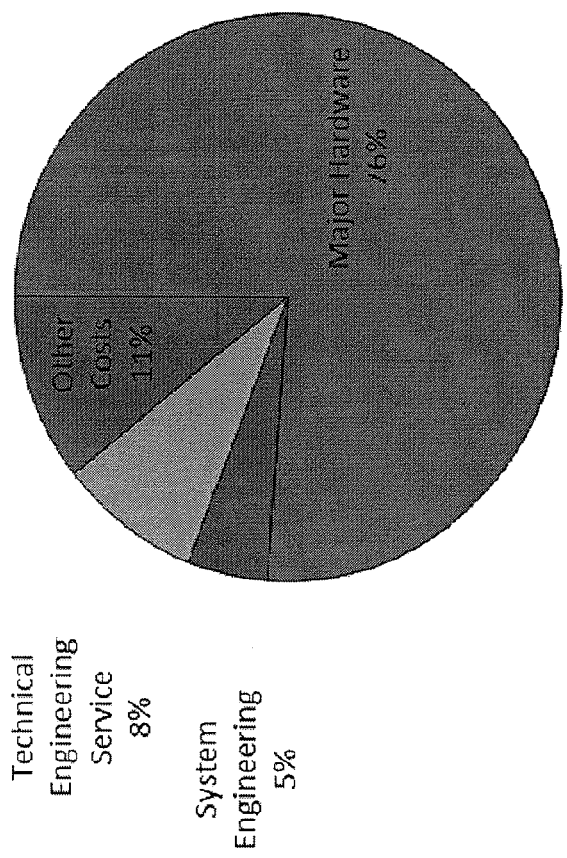
FIG. 3 illustrates an example pie graph with a breakout of Phalanx CIWS BLK 1B in accordance with an aspect of the present invention.

In practice, a single Pie chart can lead to tunnel vision and incorrect conclusions. For example, consider FIG. 3. This Pie chart shows the sub-components of the Phalanx CIWS BLK 1B. When looking at this Pie chart, the analyst may decide to focus on Major Hardware, when in reality this component represents less than 0.01% of the total cost of the Surface Combatant. Even large fluctuations in the Major Hardware element will not have impact on the overall cost. There are larger elements that exist in the overall cost, where even a small movement may be impactful. This type of tunnel vision may lead to poor conclusions and needless work. As such, Pie charts may not graphically capture the complexity of relationships that a hierarchical data structure houses.

Figure 4:
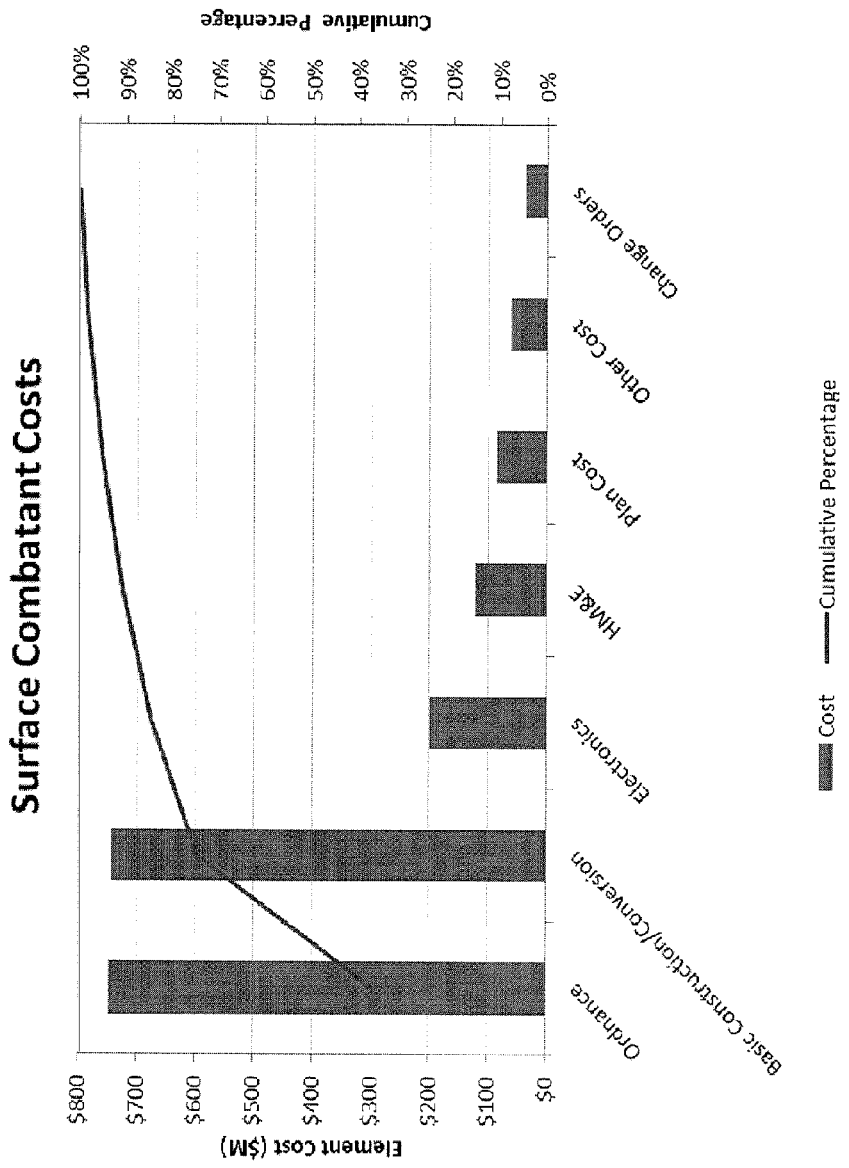
FIG. 4 illustrates an example Pareto chart of surface combatant costs in accordance with an aspect of the present invention.

Pareto Charts, named after $19^{th}$ century economist Vilfredo Pareto, attempt to display and to emphasize the most important elements in a dataset. As illustrated in FIG. 4, Pareto charts usually include all of the hierarchical data structure elements at a particular level, and present them in descending order from left to right on a column chart. Additionally, the cumulative percentage of each element may be drawn and plotted on a second Y-axis. This quickly allows an analyst to see which elements are the most important.

Figure 5:
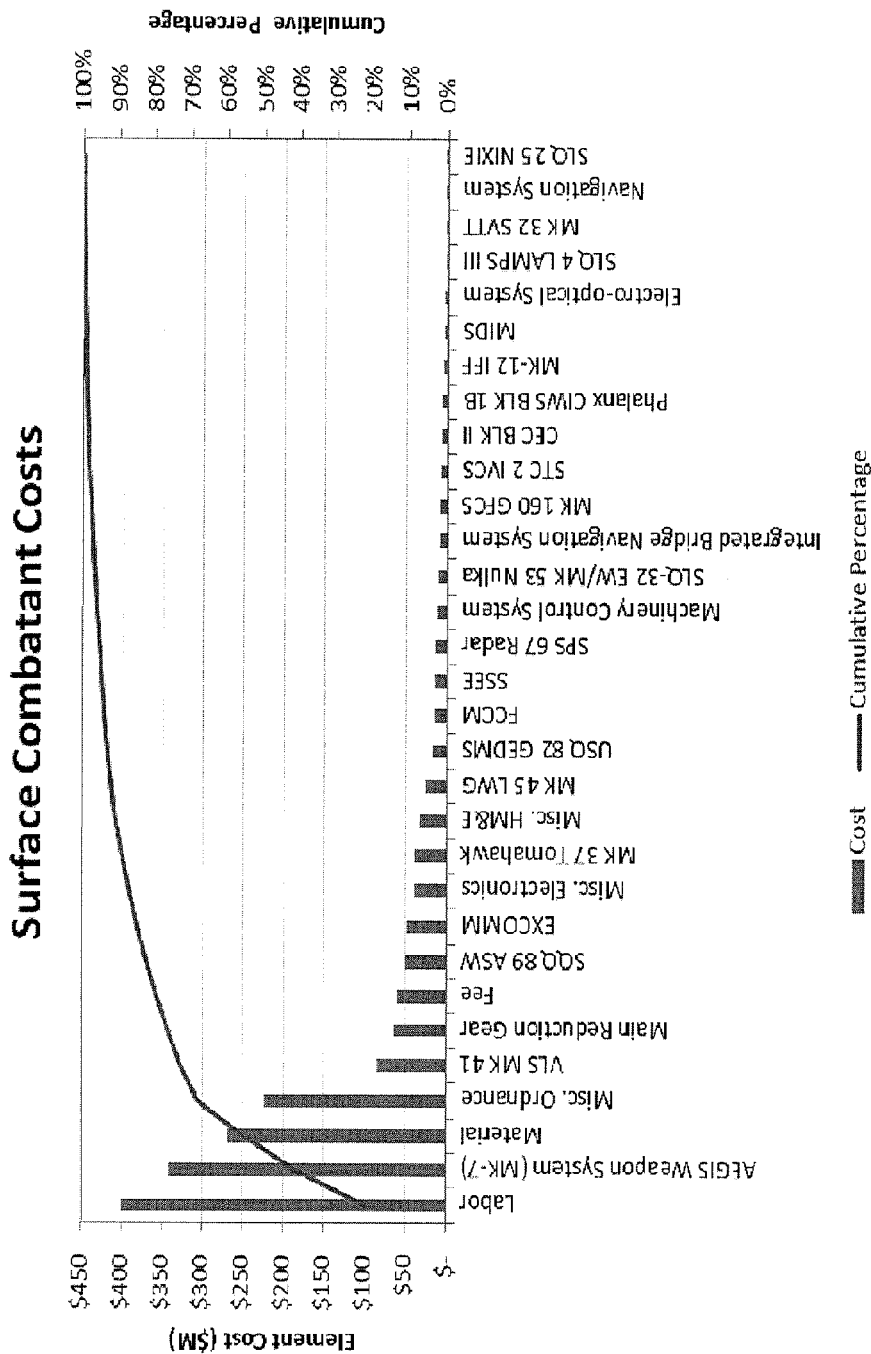
FIG. 5 illustrates an example Pareto chart of all level 3 hierarchical data structure elements in accordance with an aspect of the present invention.

Like Pie charts, Pareto charts work best when plotting the child-level data of a single parent-level element. However, analysts often will plot all child-level hierarchical data structure elements at the same time. For example, FIG. 5 shows all of the Level 3 hierarchical data structure elements from Table 1. Pareto charts may make the larger elements obvious. However, a problem with Pareto Charts may include the lack of comparable perspective with the data. Viewing one hierarchical data structure level at a time may fail to capture how all of the elements are related, i.e., parent-child relationships are lost. For instance, the fact that Labor and Material have the same parent is significant. Pareto charts displaying Level 4 elements and below can completely disguise parent-child relationships.

As demonstrated in the Surface Combatant data of FIGS. 18A and 18B, a hierarchical data structure contains varying levels of detail. Basic Construction/Conversion consists of two child-levels, whereas Plan Cost has none. Plan Cost, according to the NAVSEA 2005 Cost Estimating Handbook, "is the second major shipbuilding segment of the cost estimate . . . [and] includes the nonrecurring costs related to detailed construction plans and other associated engineering tasks for lead ships" (NAVSEA, 2005). As an analyst dives deeper into the hierarchical data structure, the analyst may have to eliminate the Plan Cost element since it may be "unfair" to compare a Level 2 element with the several Level 4 elements of Basic Construction/Conversion. An alternative approach may be to include only the lowest level elements in the Pareto chart, but parent-child relationships are lost.

If a chart only displays the children of one element, Pareto charts are susceptible to similar problems as Pie charts. Various techniques attempt to scale the Y-axis to address this concern. However, scaling the Y-axis often results in creating a chart that is difficult to read and provides little additional insight. Therefore, a Pareto chart may not graphically capture the complexity of relationships that a hierarchical data structure houses.

Unlike a pie chart or Pareto chart, a Comb chart may show all of the hierarchical data structure levels, as well as the relationships among them in a single chart. For example, FIG. 6 displays a typical Comb chart. The total is in the left-most section of the chart and movement to the right decomposes the total. Each hierarchical data structure element includes the name, value, and the percent of the total that it represents. The Comb chart may provide useful information that analysts require for comprehensive analysis and helps explain how the hierarchical data structure is structured (Cooper & Plowden, 2010).

Since a Comb chart is hierarchal in nature, the Comb chart may help analysts focus their efforts, but this type of chart is not without weakness. Two issues exist with Comb charts. First, relative magnitudes are difficult to discern. While the table clearly shows parent-child relationships, only close examination of the entire Comb chart will identify the most significant and insignificant hierarchical data structure elements. Second, when the hierarchical data structure consists of many levels and elements, multiple, separate pages are required to present the chart. Both of these practices may devalue the entire presentation of the hierarchical data structure data and may cause confusion to viewers. Thus, though Comb charts may overcome some of the shortcomings of Pie charts and Pareto charts, Comb charts may not be able to visualize quantitative data, among other drawbacks.

Figure 7:
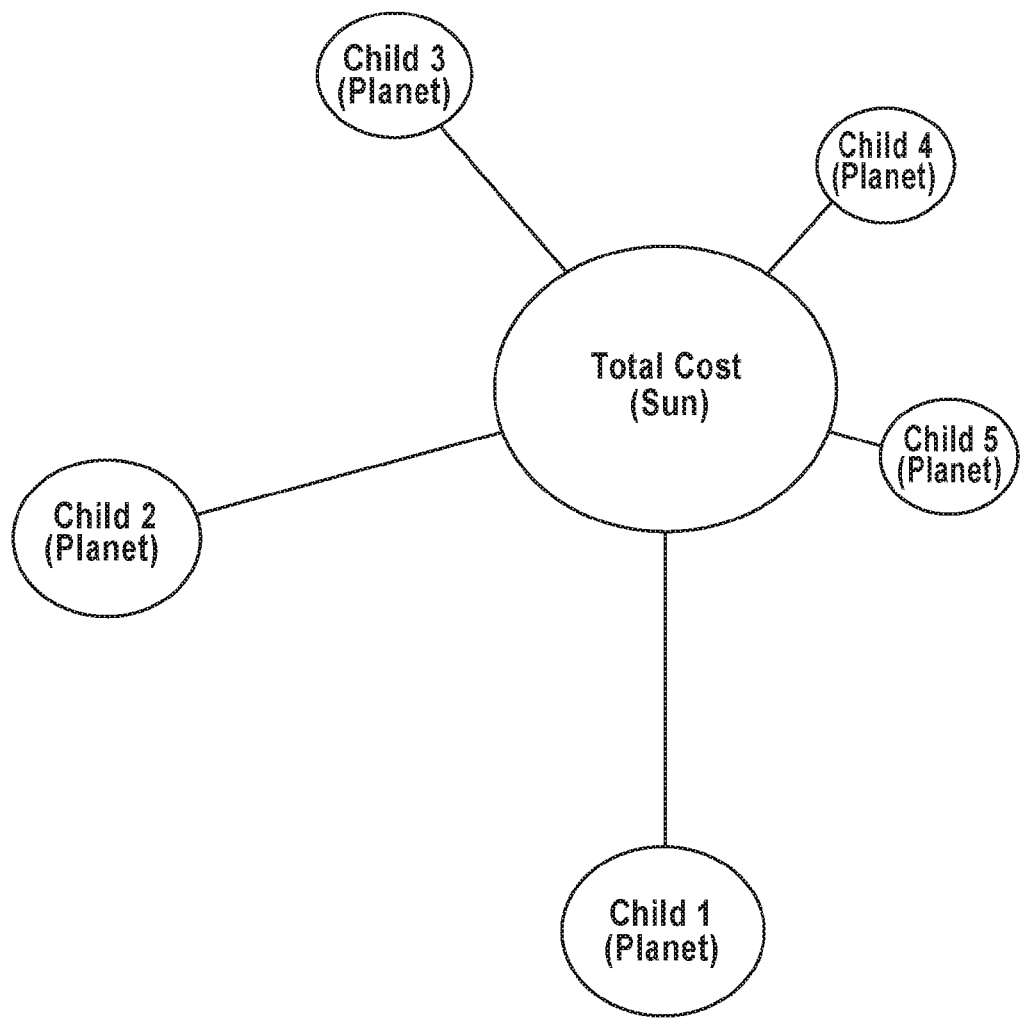
FIG. 7 illustrates an example chart illustrating sun and planets circles in accordance with an aspect of the present invention.

In contrast, the methods and systems of the present invention relate to charts that may illustrate many or all hierarchical data structure elements and their relationships on a single sheet of paper or single screen view, for example. Each hierarchical data structure element may be contained in its own shape and the shapes may connect with straight-line segments to show their relationships. FIG. 7 illustrates an example chart in accordance with an aspect of the present invention. In an aspect, the top-level, i.e., the total, may be compared to the Sun, and each of its children may be compared to Planets. On the chart, each element has its own circle. The total, i.e., the Sun, may be placed in the middle and its children, i.e., the Planets, may "orbit" the Sun. Lines drawn between the Sun and the Planets may illustrate relationships among the Sun and the Planets. Though not illustrated in this example, the children's children, i.e., the moons, may be in orbit around their respective parents. This parent-child orbiting tactic may continue down through the entire hierarchical data structure. In addition to circles, other shapes may be used in the charts, such as, but not limited to, triangles, squares, rectangles, pentagons, hexagons, and higher order shapes. Aspects of the present invention may also use three dimensions spheres, three dimensional triangles, cubes, and other three dimensional figures. When using three dimensions, the analyst may zoom around, for example, in virtual reality to view the parent and children that exist as a galaxy.

In an aspect, each circle's area may equal the circle's value, and at every level, the parent level area may equal the sum of the child level areas. An example equation for calculating the area may include:

$$\text{Parent-level area} = \Sigma(\text{Child-level areas}). \quad (1)$$

By using this sizing technique to calculate the area, top-level, larger elements may be large circles and the low-level, smaller elements may be smaller circles. In many cases, some circles become so small that the circles are almost unnoticeable, but this is by design. In addition, using this sizing technique may help analysts to focus on larger elements, and to de-emphasize smaller, inconsequential elements.

Another aspect may include sizing the circle by radius (e.g., if one circle represents twice as much as another circle, the radius would be twice as large, instead of the area). However, this may lead to disproportionate circle sizes and to distorted views of parent-child relationships, and makes hierarchical data structure comparisons very difficult.

Figure 8:
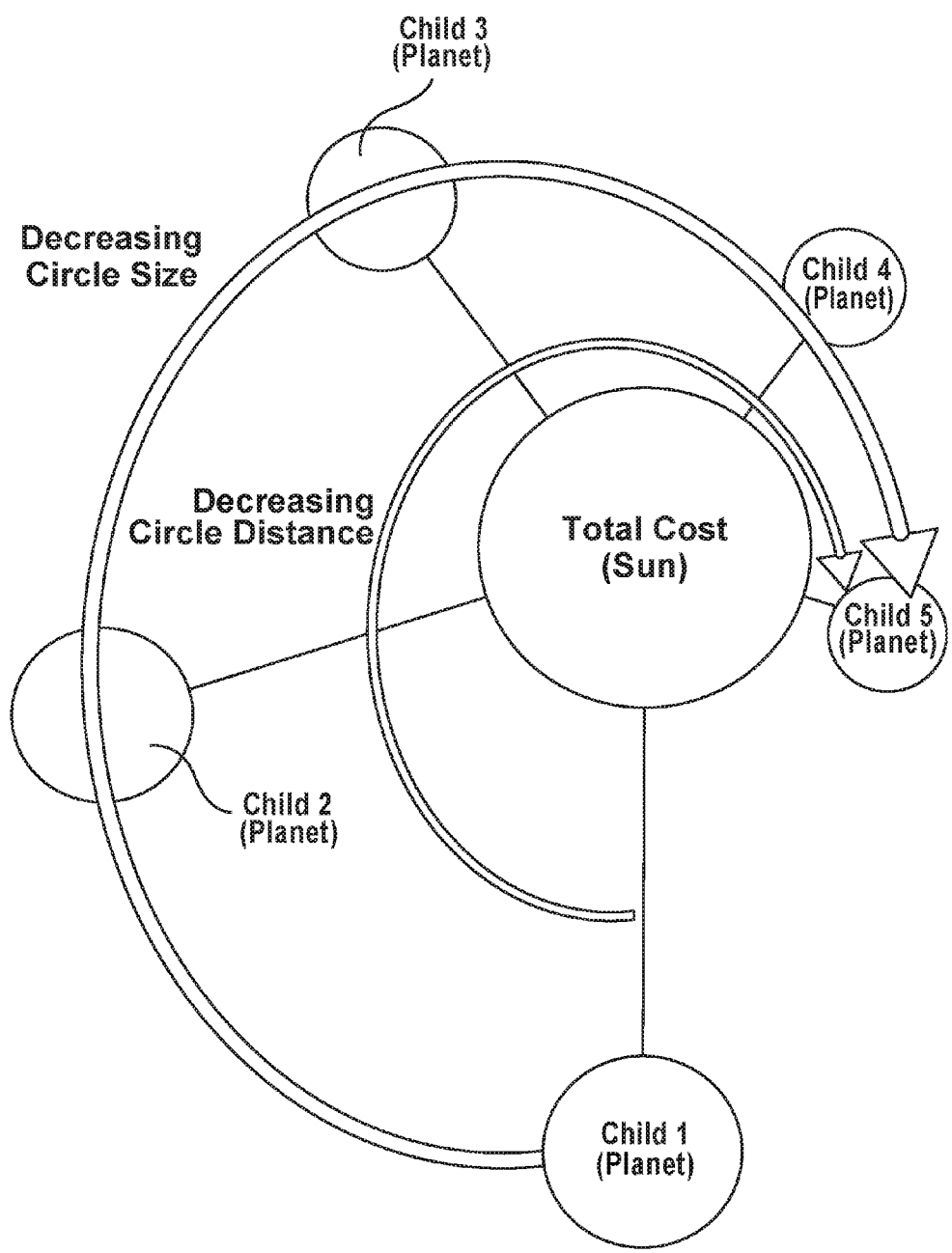
FIG. 8 illustrates a chart illustrating example decreasing circle sizes and distances in accordance with an aspect of the present invention.
Figure 9A:
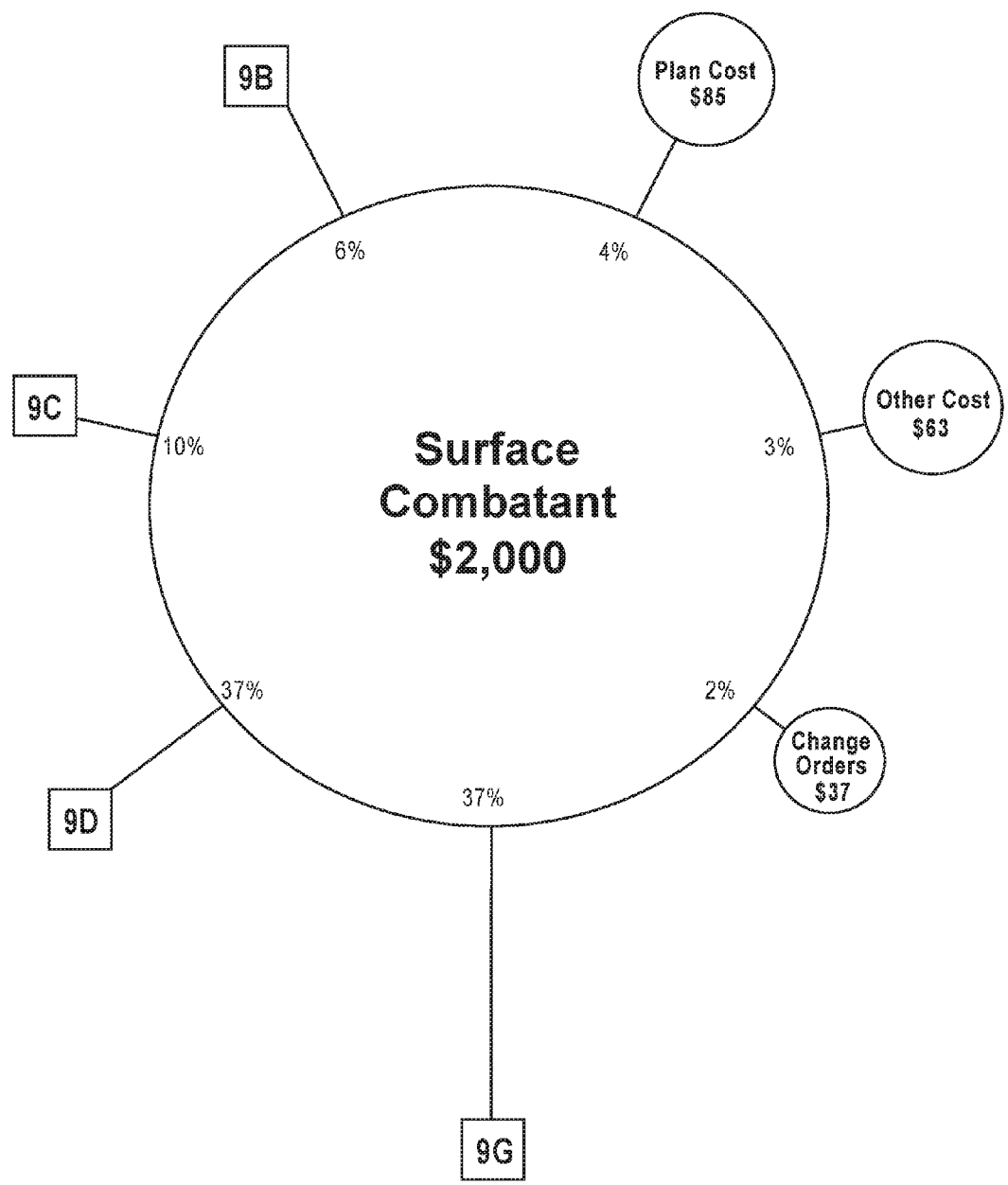
FIGS. 9A-H illustrates an example Surface Combatant chart in accordance with an aspect of the present invention.
Figure 9B:
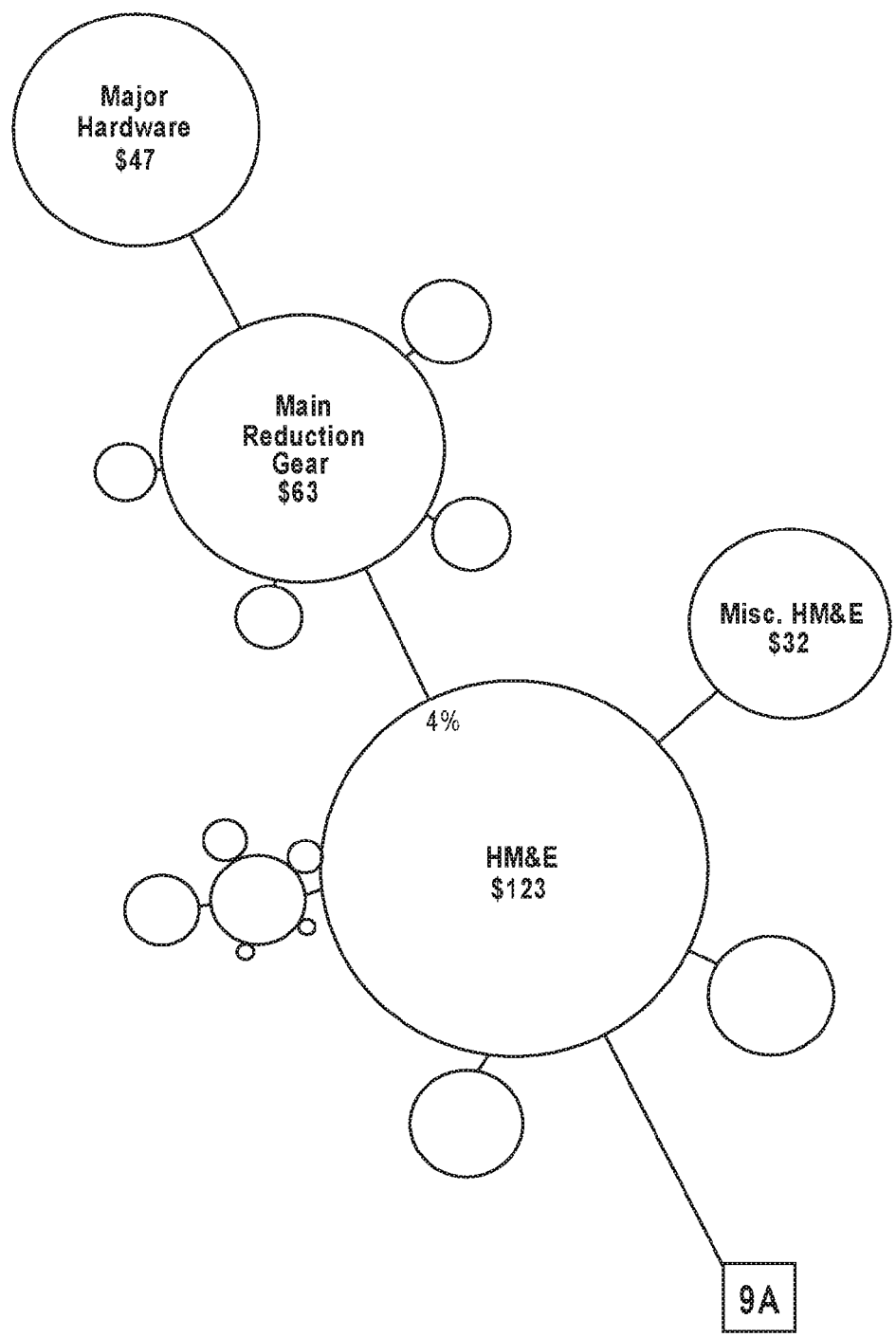
Figure 9C:
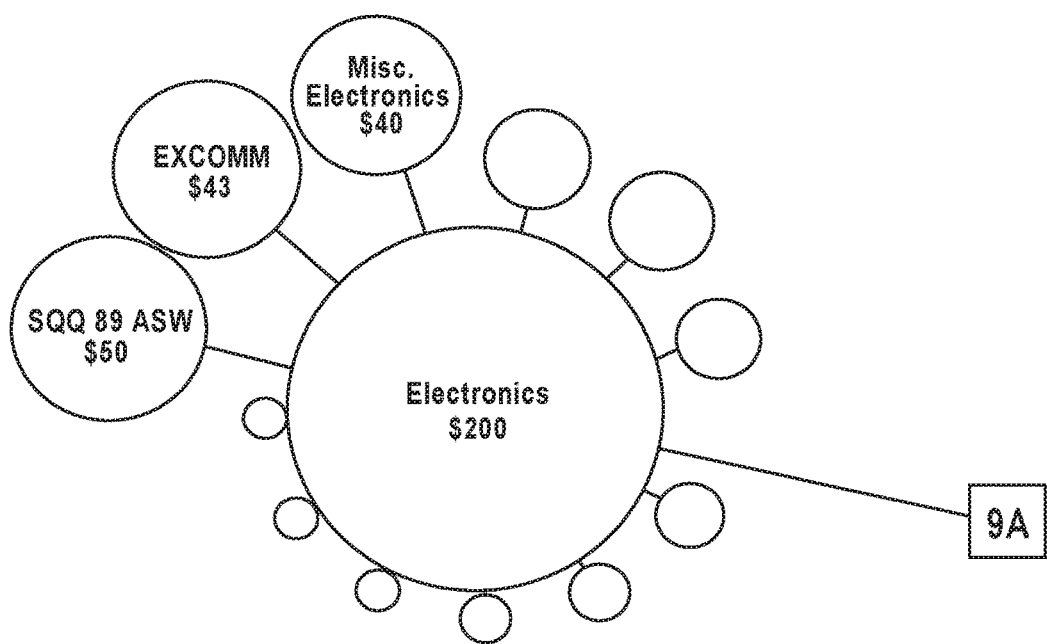
Figure 9D:
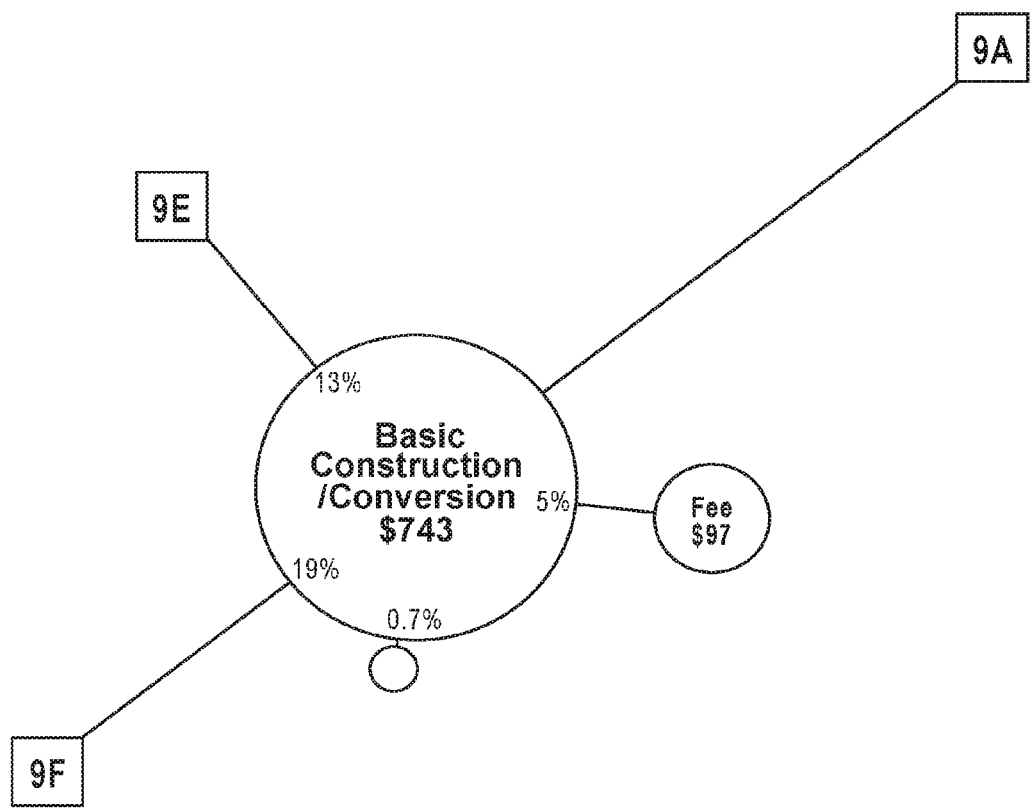
Figure 9E:
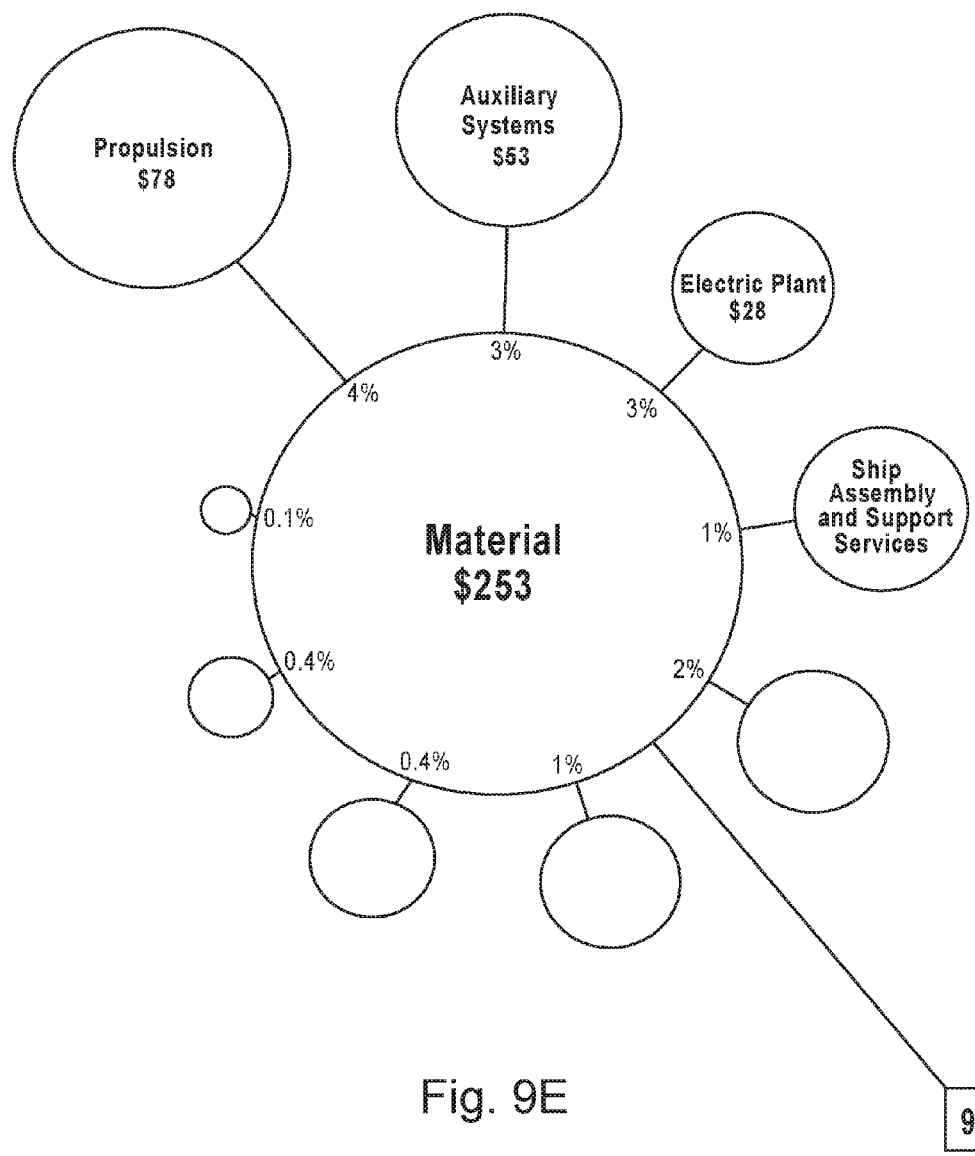
Figure 9F:
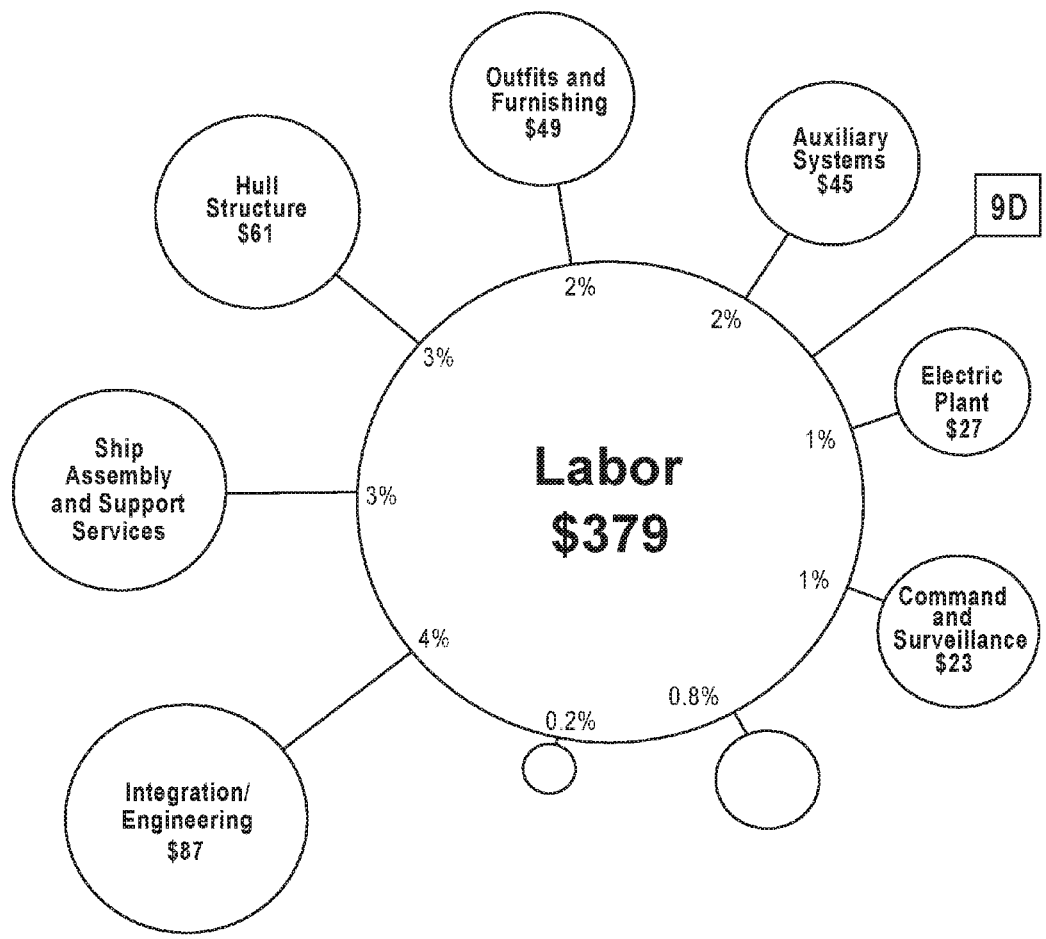
Figure 9G:
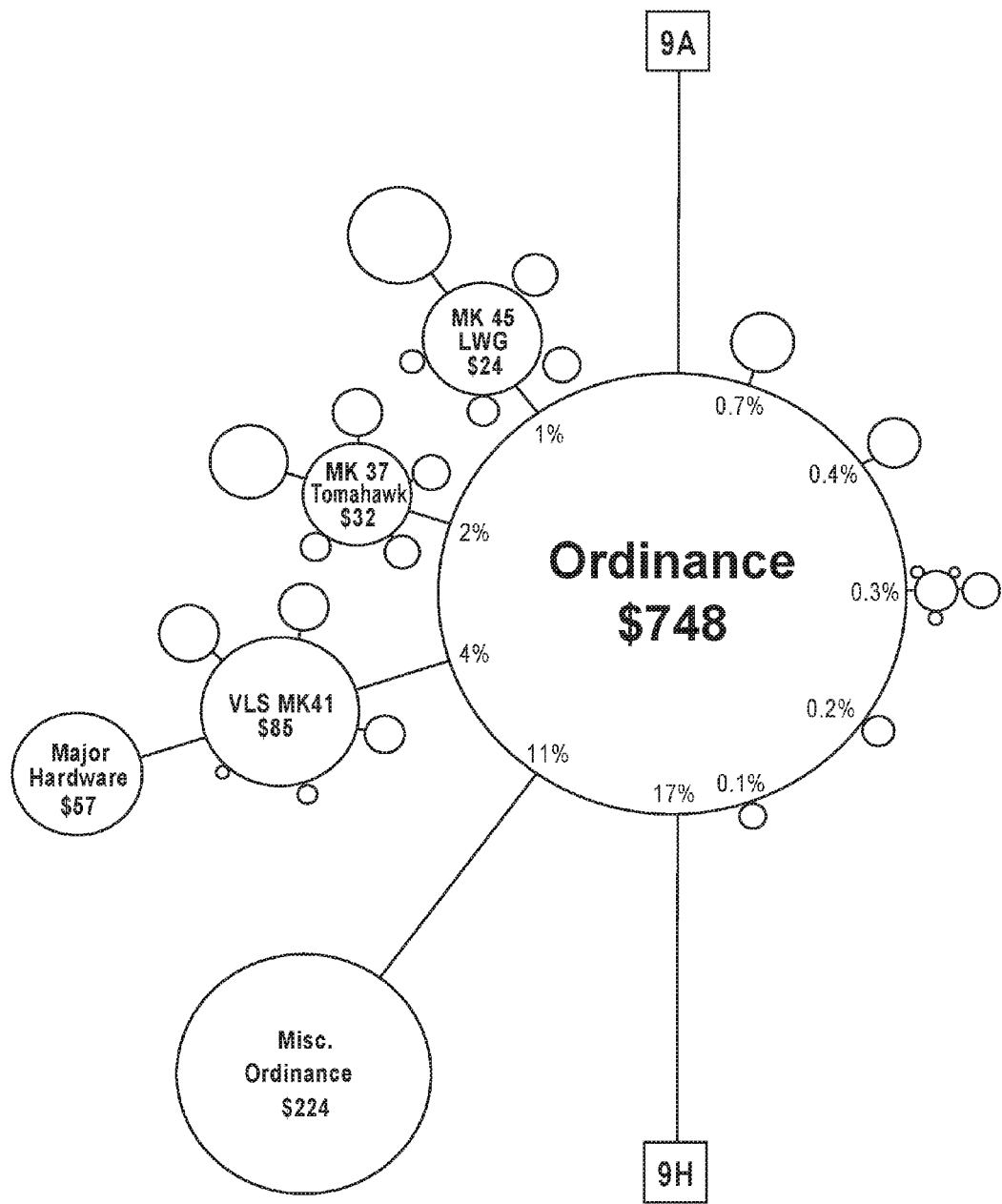
Figure 9H:
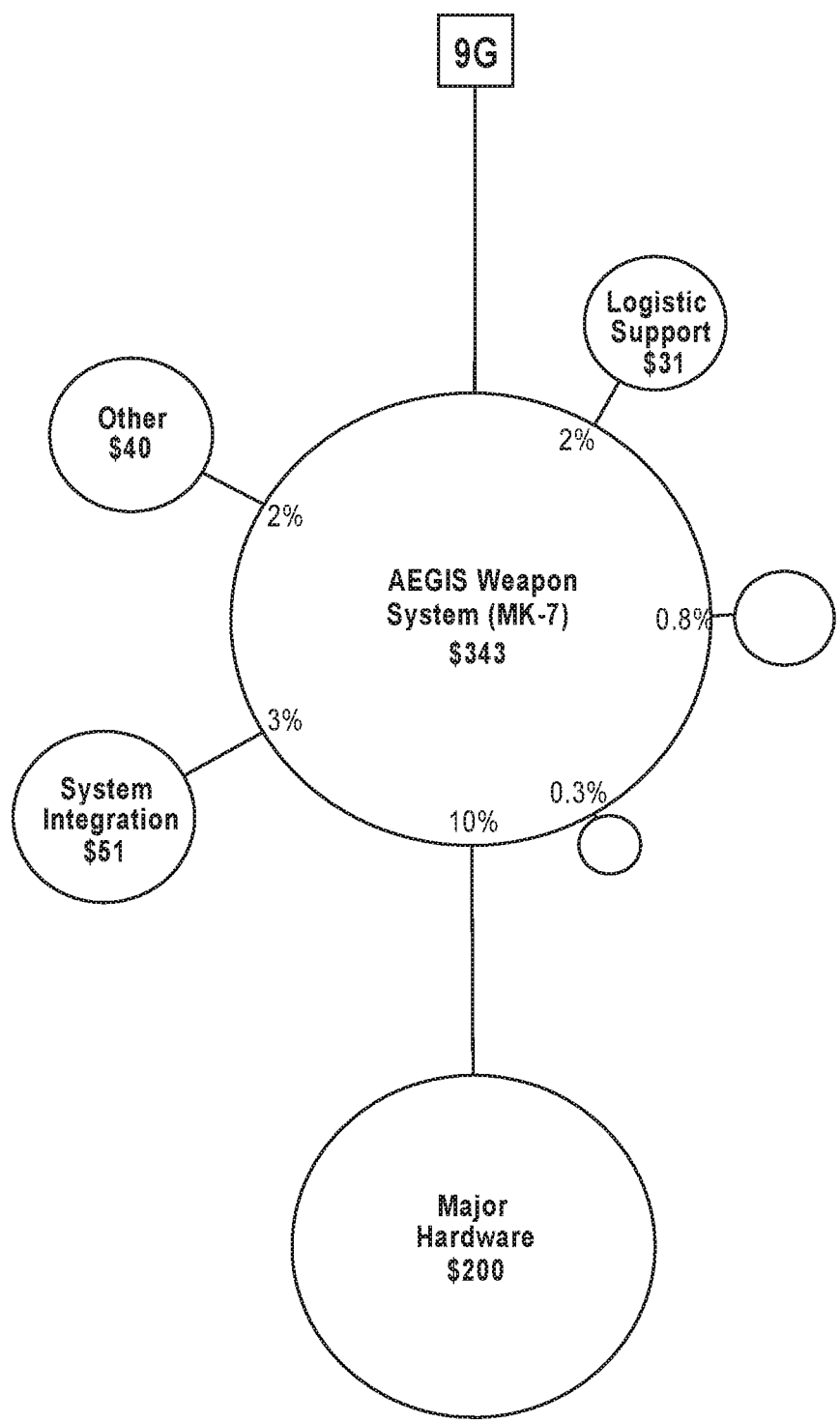

In an aspect, the parent's child elements may circle the parent in a descending manner. For example, the child elements may descend in a clockwise or counter-clockwise manner. For the total circle (e.g., the Sun), the largest element may be placed immediately below the parent, but for all other circles, the largest circle may begin 180° from where the parent line connects. In both cases, the remaining elements may be, for example, evenly spaced around their parent circle in a decreasing order relative to their size, as illustrated in FIG. 8. The distance between the parent and child may also decrease clockwise around the circle. The combination of decreasing circle size and decreasing circle distance may make it clear to an analyst how the circles are ordered.

In addition, the circles may contain an element label and amount, and, if the hierarchical data structure component has children, the circle may contain percentages (e.g., the child's percentage of the total program). The element label may represent, for example, the name of the hierarchical data structure element, and the amount represented by the circle. The percentages inside a circle may relate to the circle's respective children. For example, at the beginning of the line connecting a parent to its child, a percentage may display the child's percentage of the total program or project cost, e.g., the Sun's value. The percentage text may be relatively small, when compared to the main circle text. In addition, the text may be a different color (e.g., grey) so as not to detract visually from the rest of the text within the circle. In the smaller circles, the text may be unreadable when printed, but an analyst may zoom in to view the text in small circles when the chart is in electronic form.

In an aspect, circle borders and lines within the chart may be black in color, and the main text within each circle may be black. For each circle, the circle may be a very light shade of yellow that may enhance readability of the text within the circle and/or emphasize the text within the circle. In addition, by using a light color, such as yellow, copying the chart without loss of clarity may occur. While the above example uses light yellow for the circle shading, it should be noted that other colors may be used for the circle shading.

Aspects of the present invention may illustrate sizing values relative to the total by scaling the area. In addition, by arranging child-level elements in a descending order, the chart may illustrate where the highest values are located. Lastly, the chart may illustrate the interrelated structure of showing every hierarchical data structure element, sub-element, and the relationships that exist among them.

Referring now to FIG. 9, illustrated therein is an example chart in accordance with an aspect of the present invention. This chart contains ninety-four hierarchical data structure elements on a single page. While many of the smaller Moons may be important, this type of display may help an analyst keep in mind how small these hierarchical data structure elements are, relative to the total.

In an aspect, the method for constructing a chart may be automated using computer code. As such, the construction of charts in accordance with aspects of the present invention may be quick, neat, and a repeatable process operable via a software program written, for example, in Excel VBA, or a more advanced programming language.

Figure 10:
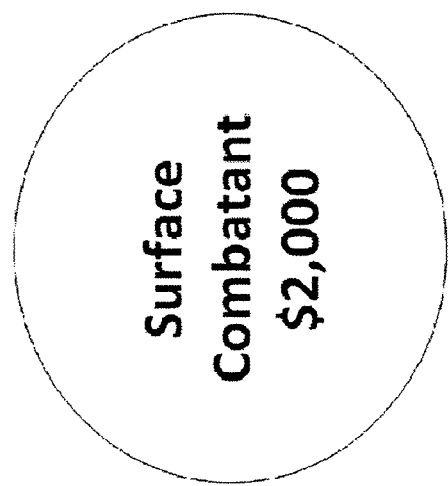

The method may start with the top-most hierarchical data structure element, e.g., the Sun. In this example, the sun is represented by a large circle, with an area of 9.0 square inches (in$^2$), as illustrated in FIG. 10. Inside the Sun circle a label with the element name and the total value may be inserted. In addition, the color of the circle may be changed to a light yellow color to make the circle distinctive on a white page, for example.

The method may also include adding the Sun's child-level elements, e.g., the Planets, to the chart. The Planets may be ordered from largest to smallest. Next, the method may include determining the percentage each child-level element is of the total by dividing the child-level value by the total value. In order to determine the area of the circle of the element, the percentage of the child level element may be multiplied by the area of the Sun's circle area (9.0 in$^2$). The method may further include determining each circle's radius based on the area calculated for the child-level circle. An example equation for determining the radius of the circle may include:

$$\text{Radius} = \sqrt{\frac{\text{Area of the Child-Level Element}}{\pi}} \quad (2)$$

Figure 11:
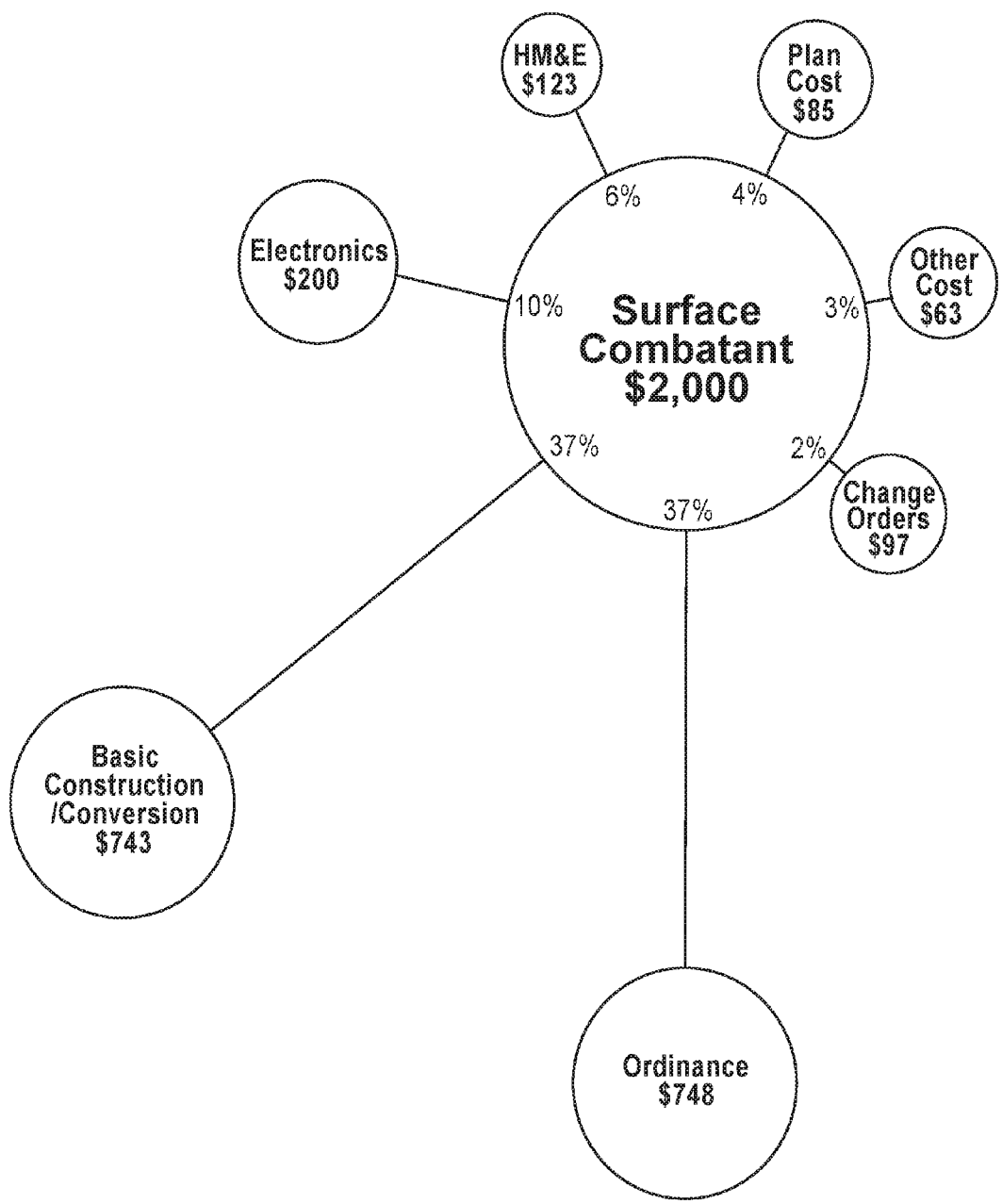

As is summarized in Table 2, the data needed to draw the next set of circles on the chart is available. Each circle may display the hierarchical data structure label name and the value. In some cases, the font size may need adjusting to make everything readable. As illustrated in FIG. 11, the most significant child-level element, i.e., Ordnance, may be placed immediately below the total circle, and each subsequent element may be placed in a clockwise manner. In this example, each element may be separated by 51°, e.g., 360° divided by the number of child-level elements, e.g., 7. A scaled straight-line segment may connect each child-level element with the parent. As the child-level circles get smaller, the line segments may decrease, so that the circles are closer and closer to the parent circle. This descending order and shorter distance to the parent may visually identify the contribution of each child-level element to the total (e.g., the line segment length and circle size may convey magnitude). As such, the length of the line segment between a parent and its children may decrease in a counterclockwise manner as the size of the children's circles get smaller. Lastly, each child's percentage contribution to the total may be added to the parent-level circle, just inside the parent circle at the base of each child.

TABLE 2

Hierarchical Data Structure Level 2 Circle Calculations.

| Number | Name | Cost | Percent of Total | Area (in$^2$) | Radius (in) |
|---|---|---|---|---|---|
| 1.7 | Ordnance | $748 | 37.4% | 3.37 | 1.04 |
| 1.2 | Basic Construction/Conversion | $743 | 37.2% | 3.35 | 1.03 |
| 1.4 | Electronics | $200 | 10.0% | 0.90 | 0.54 |
| 1.5 | HM&E | $123 | 6.1% | 0.55 | 0.42 |
| 1.1 | Plan Cost | $85 | 4.3% | 0.38 | 0.35 |
| 1.6 | Other Cost | $63 | 3.2% | 0.28 | 0.30 |
| 1.3 | Change Orders | $37 | 1.9% | 0.17 | 0.23 |

The method may proceed to the next hierarchical data structure level. The same processes and calculations for each circle as discussed above may be applied to the next hierarchical data structure level. In this example, the most significant child-level element may be placed at 180° from the parent-level element, with additional elements moving clockwise with each subsequent element being placed on the chart. This allows a viewer to trace the largest elements throughout the chart. In addition, the most significant elements for any parent-level may be located on the same vector. Thus, once the characteristics of every circle are calculated and inserted into the chart, the chart is complete. In order to minimize clutter, charts with information below hierarchical data structure Level 4 may be discouraged.

While the above aspects illustrate example charts illustrating costs, any quantifiable measure such as, but not limited to, revenue, donations, people, distance, weight, molecules, wealth, taxes, height, mass, and energy may be illustrated. For instance, the population of the world may be broken down by continents, countries, states, providences and cities. In another example, the charts may illustrate the wealth of the world and may be able to compare the differences of the population versus wealth distribution. Moreover, the charts may illustrate changes in populations over time.

Figure 12:
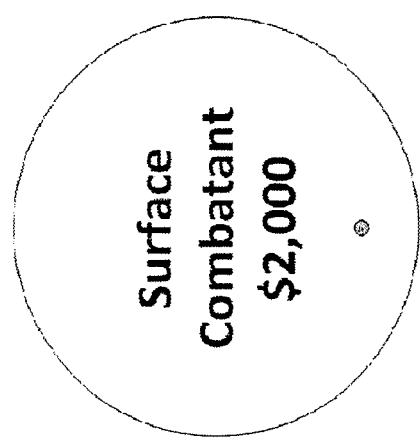
Figure 13A:
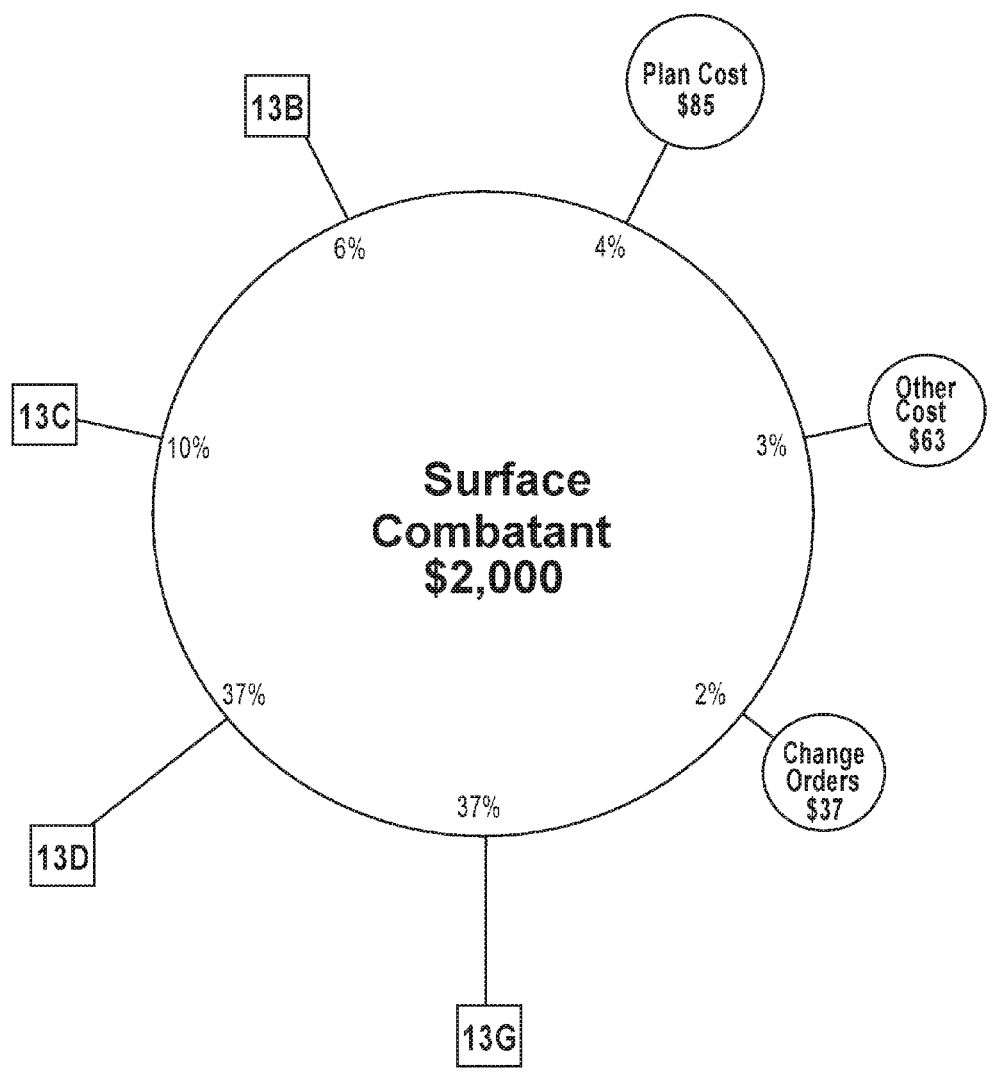
FIGS. 13A-H illustrates a chart illustrating surface combatant, only showing elements greater than 1% in accordance with an aspect of the present invention.
Figure 13B:
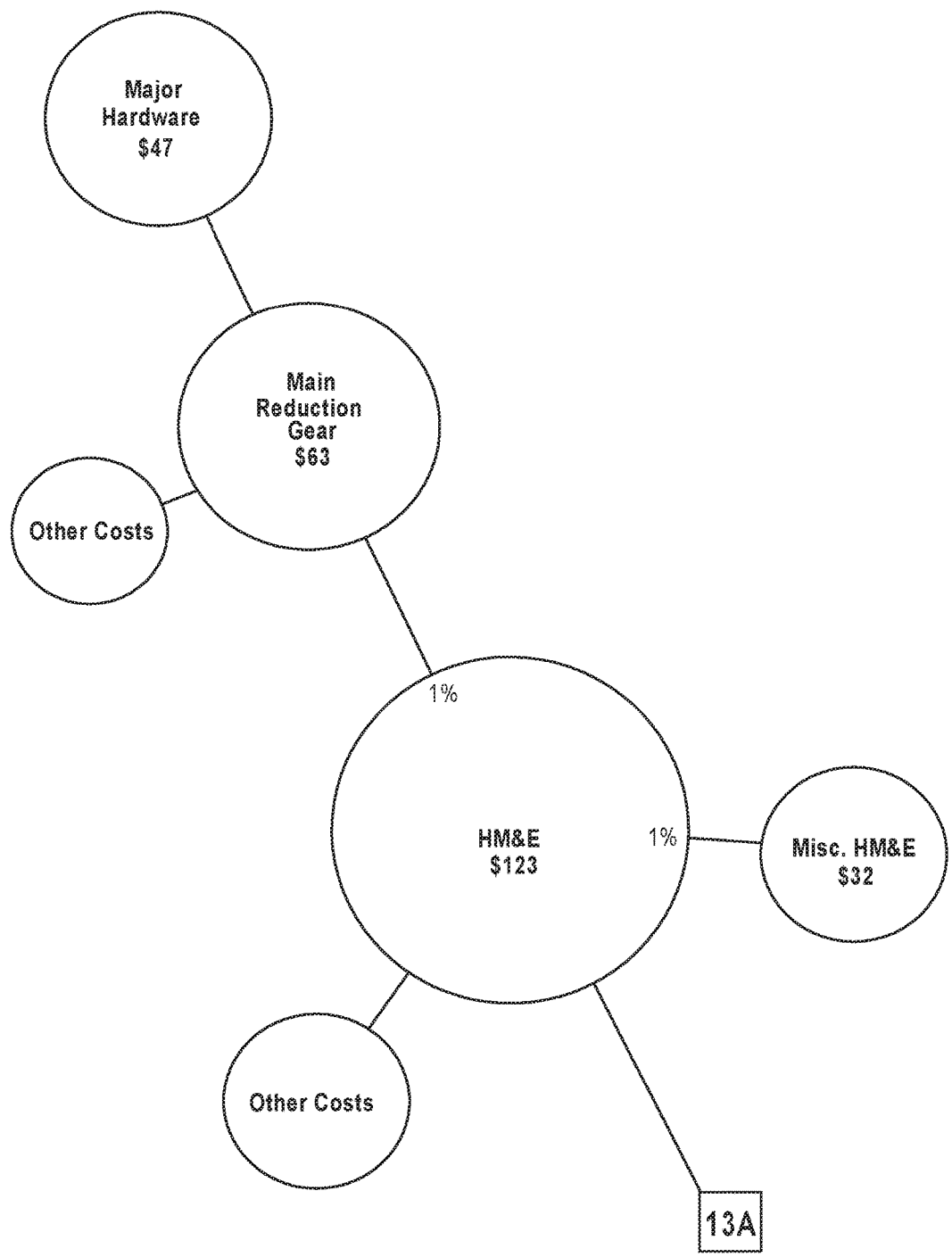
Figure 13C:
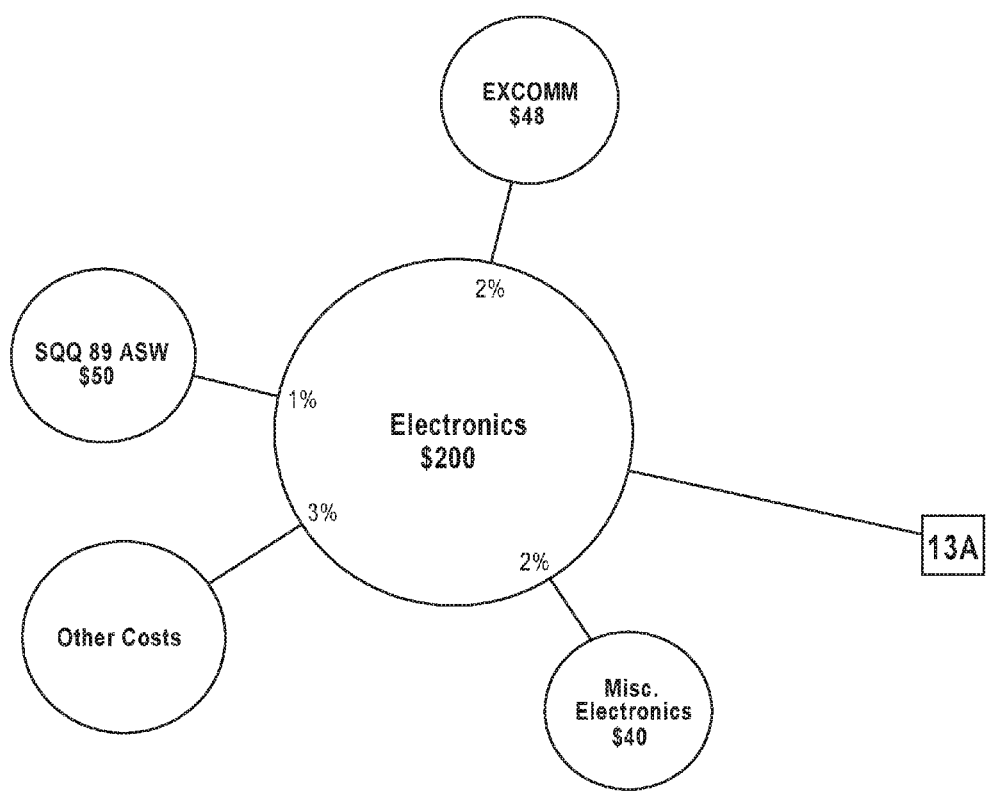
Figure 13D:
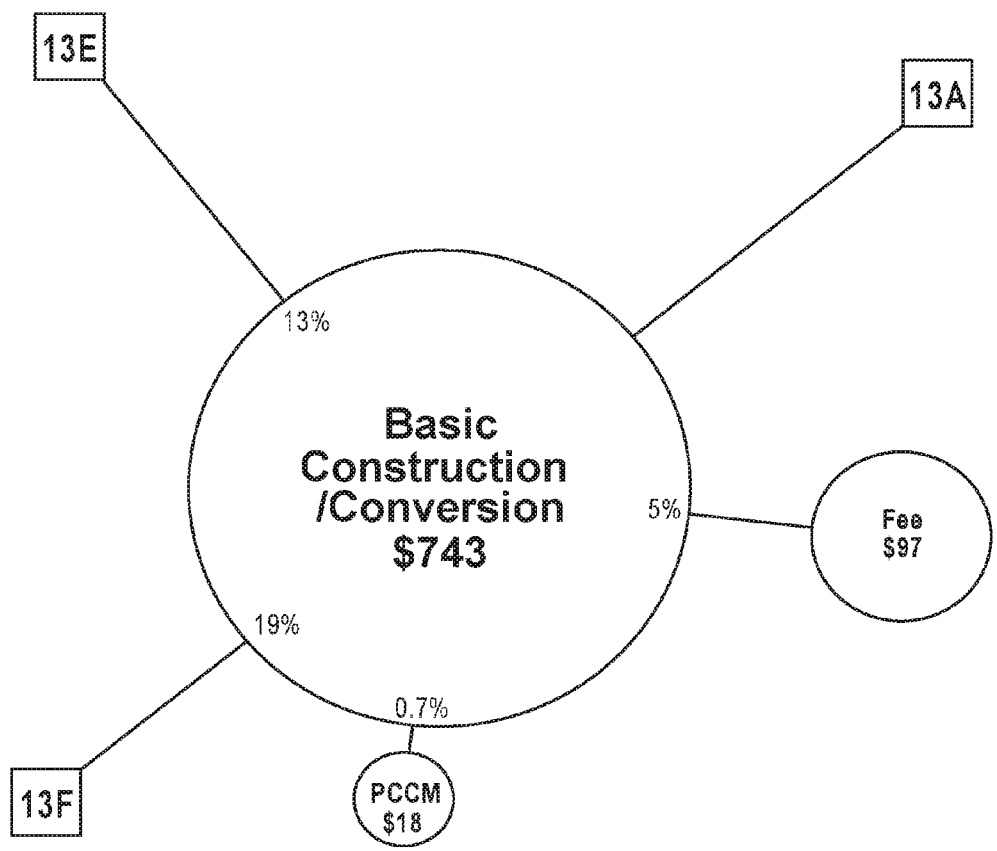
Figure 13E:
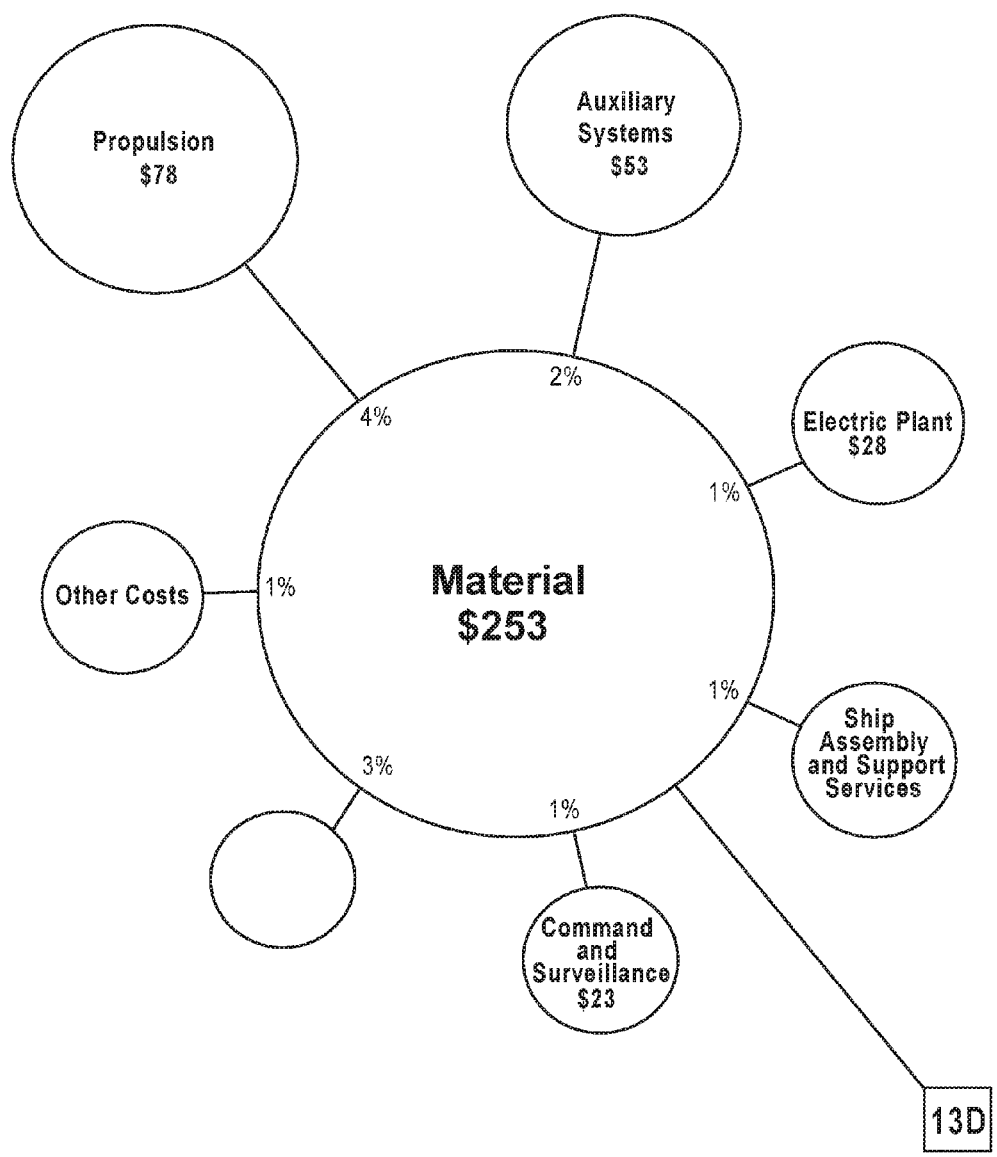
Figure 13F:
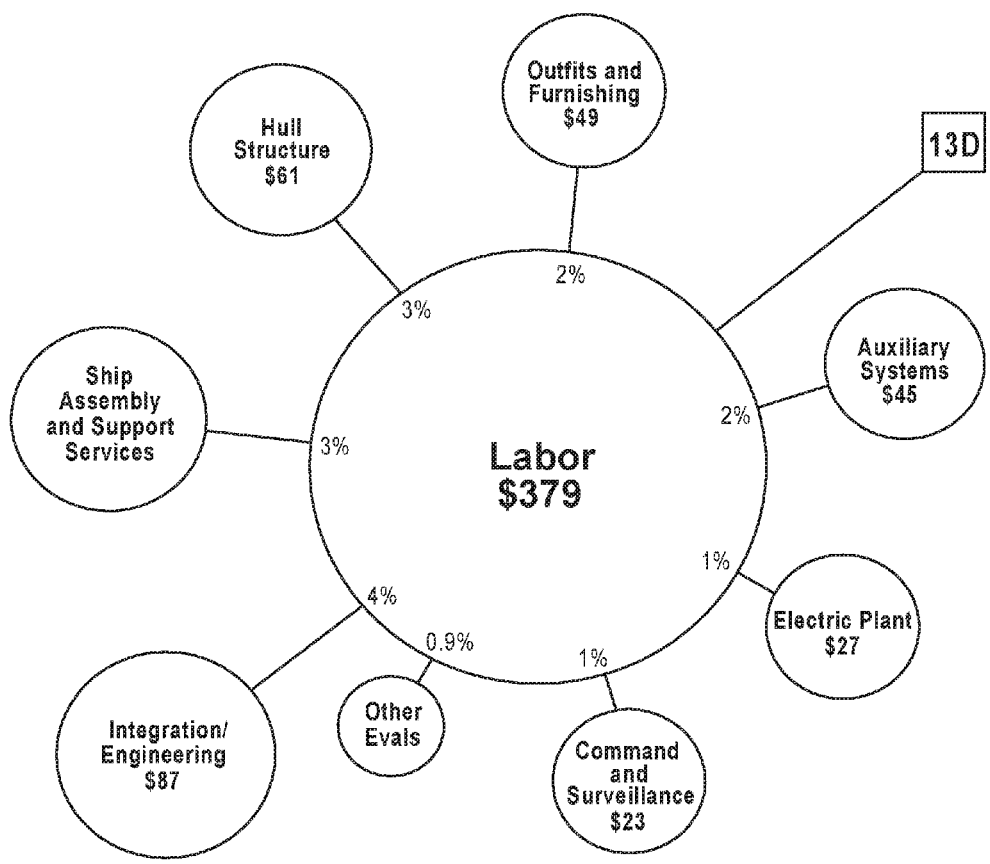
Figure 13G:
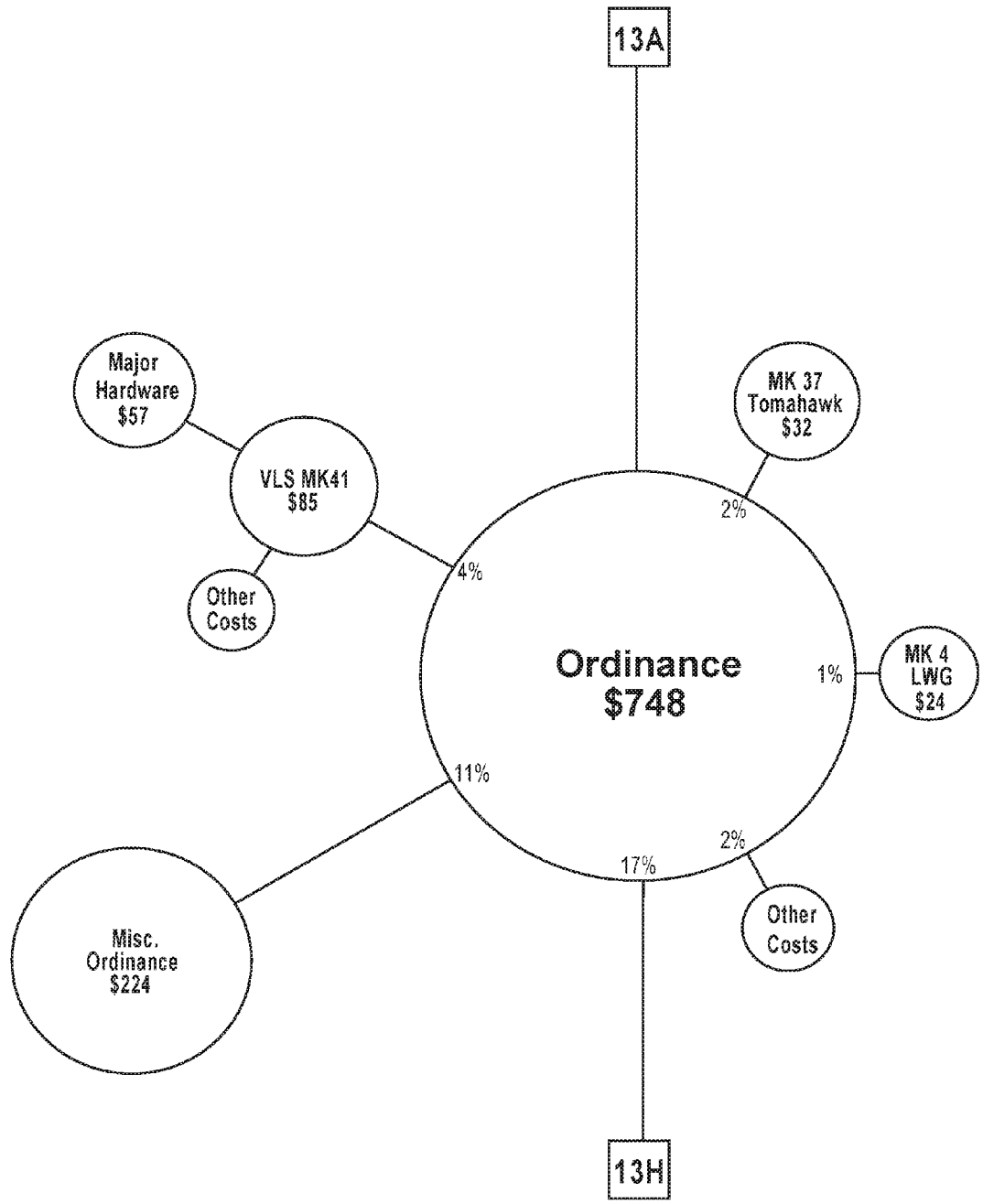
Figure 13H:
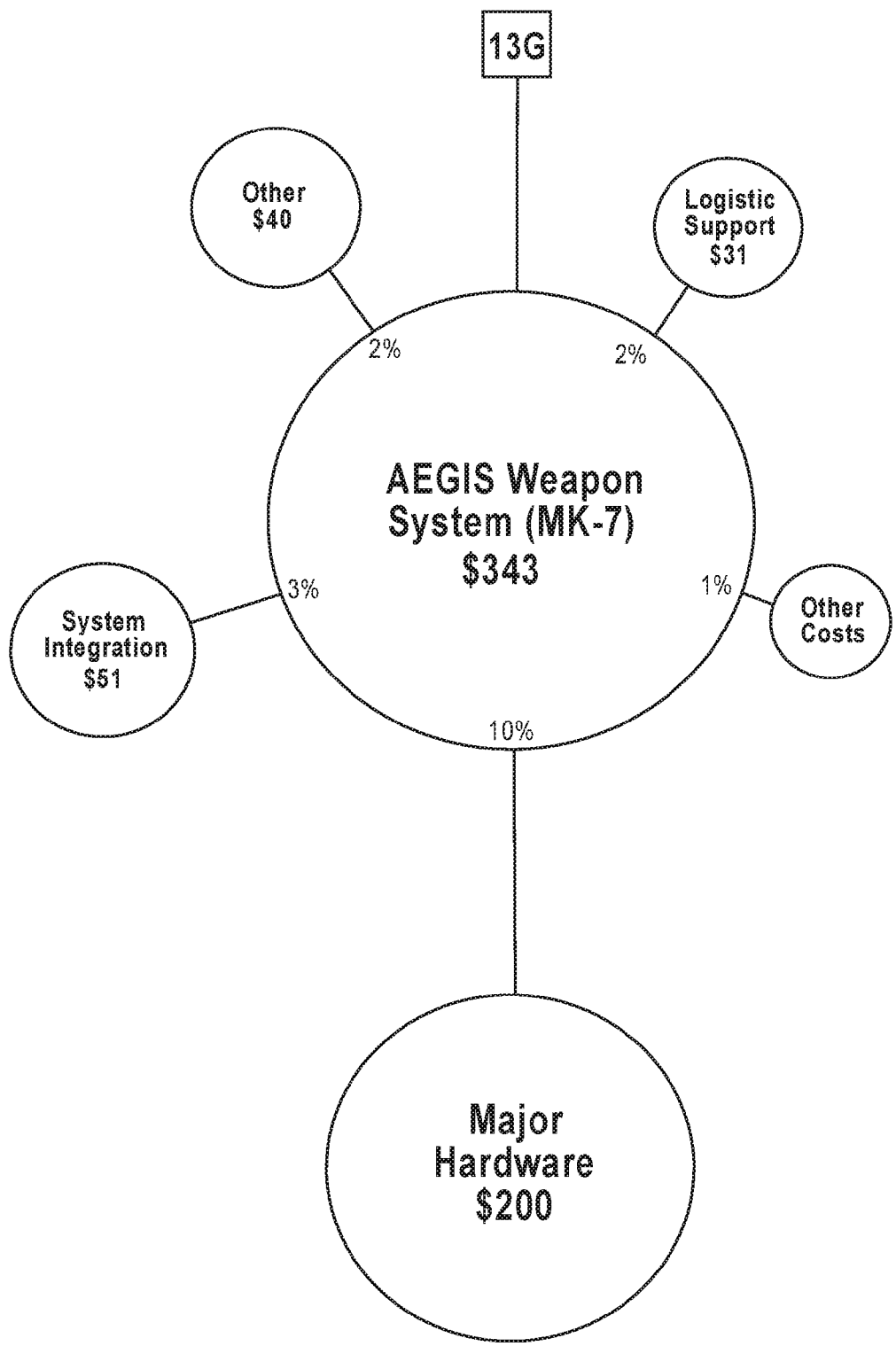

When looking at an Initial Estimate displayed on a chart created in accordance with an aspect of the present invention, insights may be quickly available. Due to the nature of the sizing, perhaps the most apparent insight may be the identification of the largest elements. Since the size of a circle relates directly to its value, the larger circles may be the circles upon which an analyst may want to focus more energy. The smaller circles, particularly those whose text may be difficult to read, may not be as important in the entirety of the Initial Estimate. For example, in FIG. 12, the Surface Combatant's circle includes a circle indicative of the MK 32 SVTT's value. The MK 32 SVTT's circle appears almost as a dot, or a small "sunspot" on the Surface Combatant's circle. Even if the MK 32's value doubled, the value of the Surface Combatant would not substantially change. As such, a carefully constructed chart in accordance with aspects of the present invention may graphically emphasize such a difference. As illustrated in FIG. 12, the two circles may be overlaid to emphasize the value difference.

As illustrated in FIG. 9, sometimes the level of detail available in a hierarchical data structure may be significant and the resulting chart may become "cluttered," and, perhaps, confusing. To diminish the clutter, many of the smaller circles may be removed and consolidated. For example, in FIG. 13, all circles representing less than 1% of the total were removed and consolidated into fewer "Other Cost" circles. This reduces the number of circles illustrated by nearly 50%, creating a much clearer picture of the most significant elements.

Circle removal and consolidation at any percentage level may occur. However, in an aspect, an important characteristic of the charts may include the emphasis of significant elements via visual cues. Therefore, since large circles will likely always be more noticeable and eye-catching than small circles, removal and consolidation will likely be an unnecessary activity.

Figure 14:
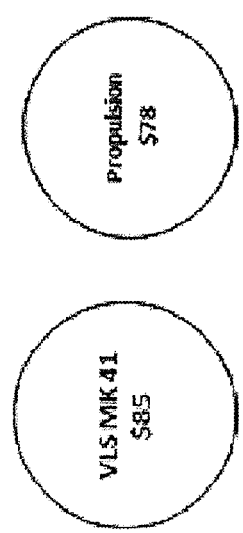

In an aspect, the charts may allow comparisons among dis-similar elements. For example, as illustrated in FIG. 14, the Propulsion (Material) and VLS MK 41 circle sizes, and values, are similar. Many other comparisons are immediately visible, too. Yet, before the chart was drawn, analysts might have overlooked an insight such as this.

A well-created Pareto chart might also allow similar comparisons. However, in this example, Propulsion (Material) is a Level 4 element, without any child-level elements, whereas the VLS MK41 is a Level 3 element, with two children-level elements. Very few Pareto charts would have put these two elements on the same chart.

Figure 15A:
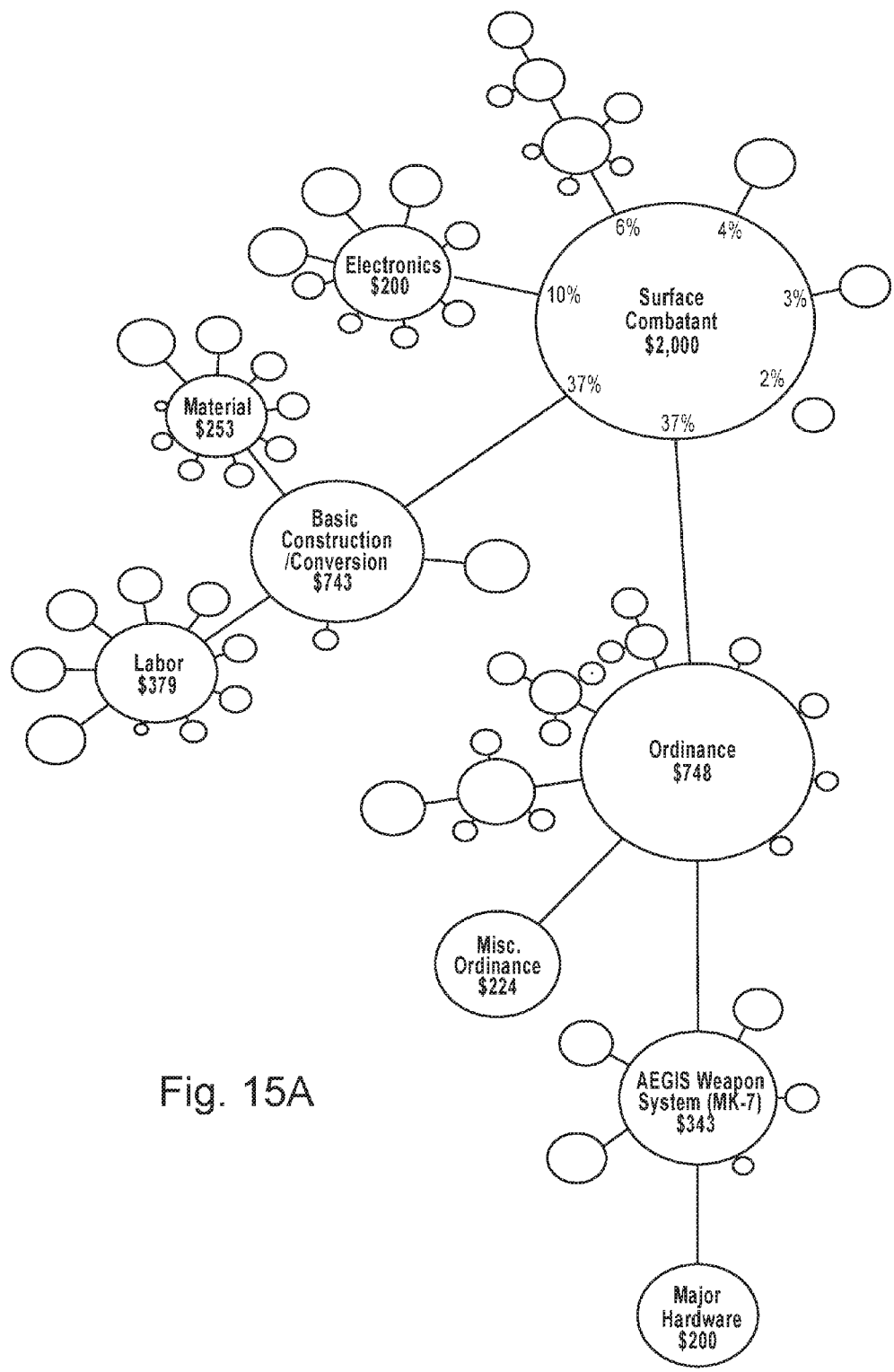
FIGS. 15A-B illustrates surface combatant and amphib charts in accordance with an aspect of the present invention.
Figure 15B:
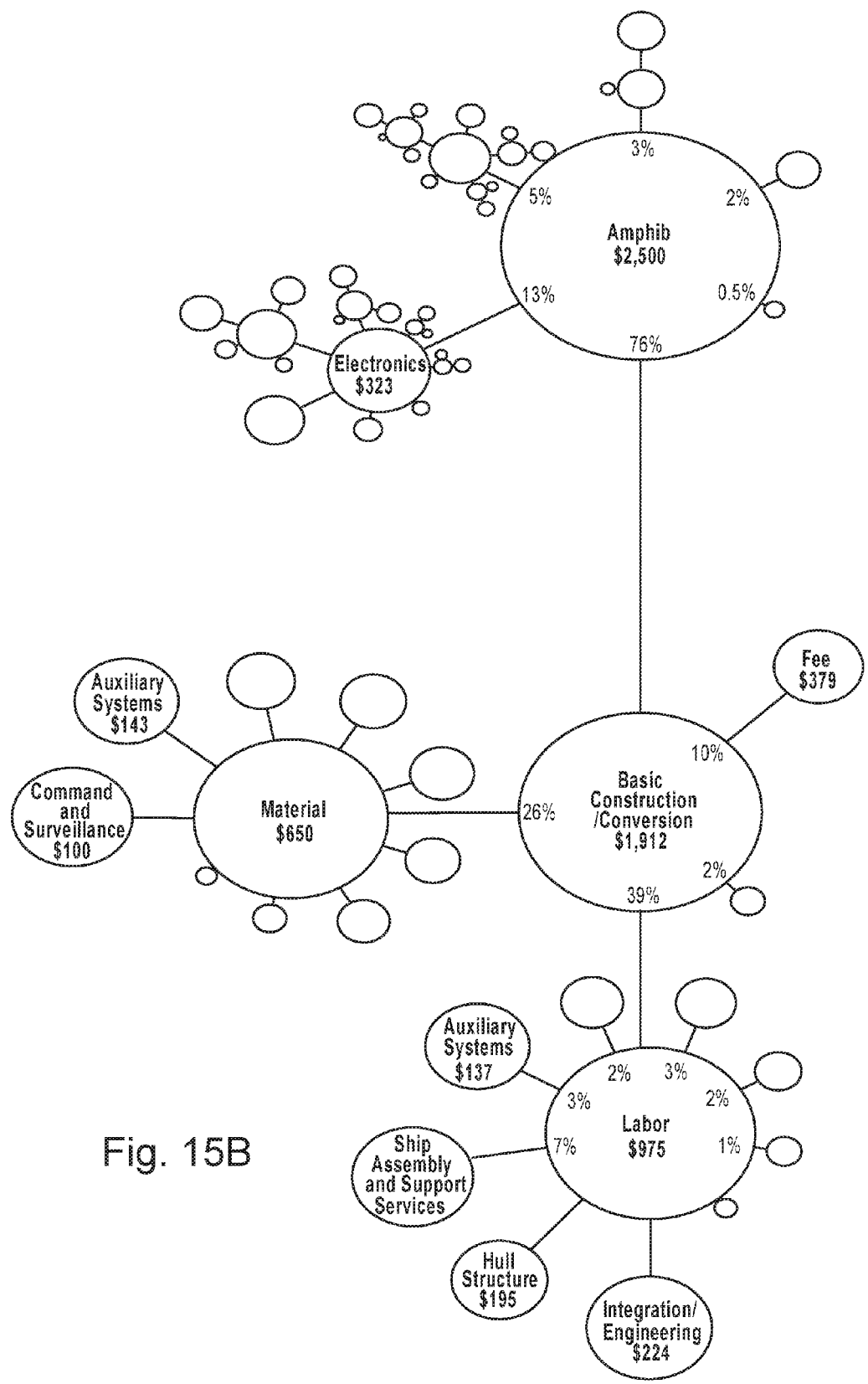

In another aspect, multiple side-by-side charts may enable detailed comparisons among the side-by-side charts. For this example, suppose that the Surface Combatant of FIG. 9 is one of the two alternatives for an Analysis of Alternatives (AoA) study. The other alternative is an Amphibious Ship (Amphib). As illustrated in FIG. 15, using data from the AoA, there may now be two charts, one for each alternative that may be compared.

For example, though the child-level elements of the total are similar between the two ships, the order is different. In FIG. 15, Ordnance is the largest child-level element of the total for the Surface Combatant, but the third largest for the Amphib. When an analyst considers the missions of the two ships, it may make sense for Ordnance, i.e., the combat system, to be a very large part of a Surface Combatant's total. Basic Construction/Conversion is the largest child-level element for the Amphib, but not for the Surface Combatant. Again, this discovery closely aligns with the mission of an Amphib.

Since the same scale size applies to all of the circles in FIG. 15, relative circle sizes provide useful comparisons. Aside from the fact that the Amphib is more expensive than the Surface Combatant, it is noteworthy that the Basic Construction/Conversion of the Amphib is approximately equal to the End Cost of the Surface Combatant. Further, an analyst may observe that Basic Construction/Conversion is significantly greater for the Amphib than for the Surface Combatant. At the lower levels of the hierarchical data structure, other comparisons and contrasts may exist. One example may include that the Labor cost for Integration/Engineering of the Amphib is almost as much as all of the Material cost for the Surface Combatant.

Viewing two charts side-by-side enables numerous comparisons and insights. Suppose the above example AoA included only one concept and variations on the concept. By aligning multiple, side-by-side charts the value differences among the variants may be easily recognizable.

Figure 16A:
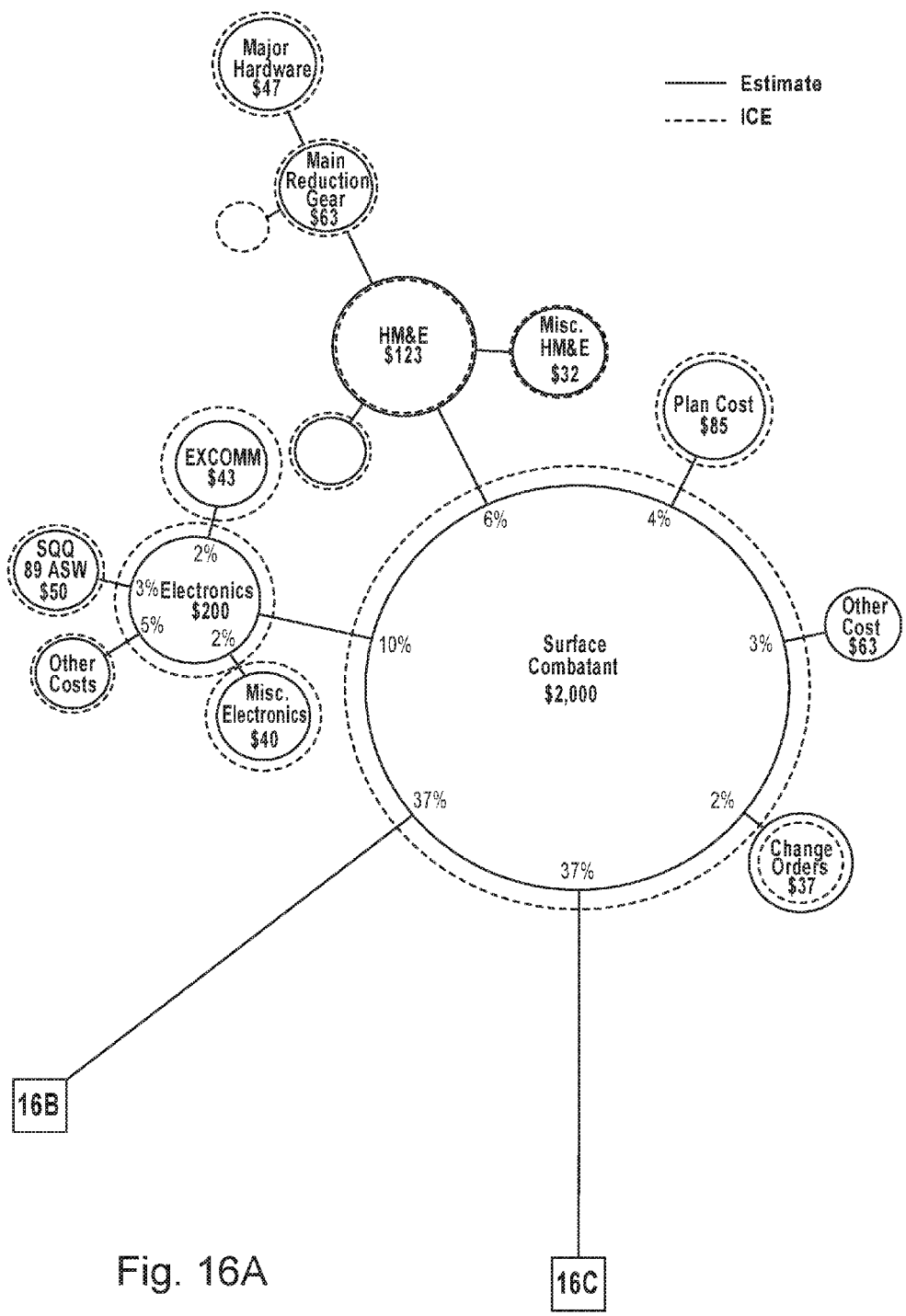
FIGS. 16A-C illustrates a chart showing both the initial estimate and ICE in accordance with an aspect of the present invention.
Figure 16B:
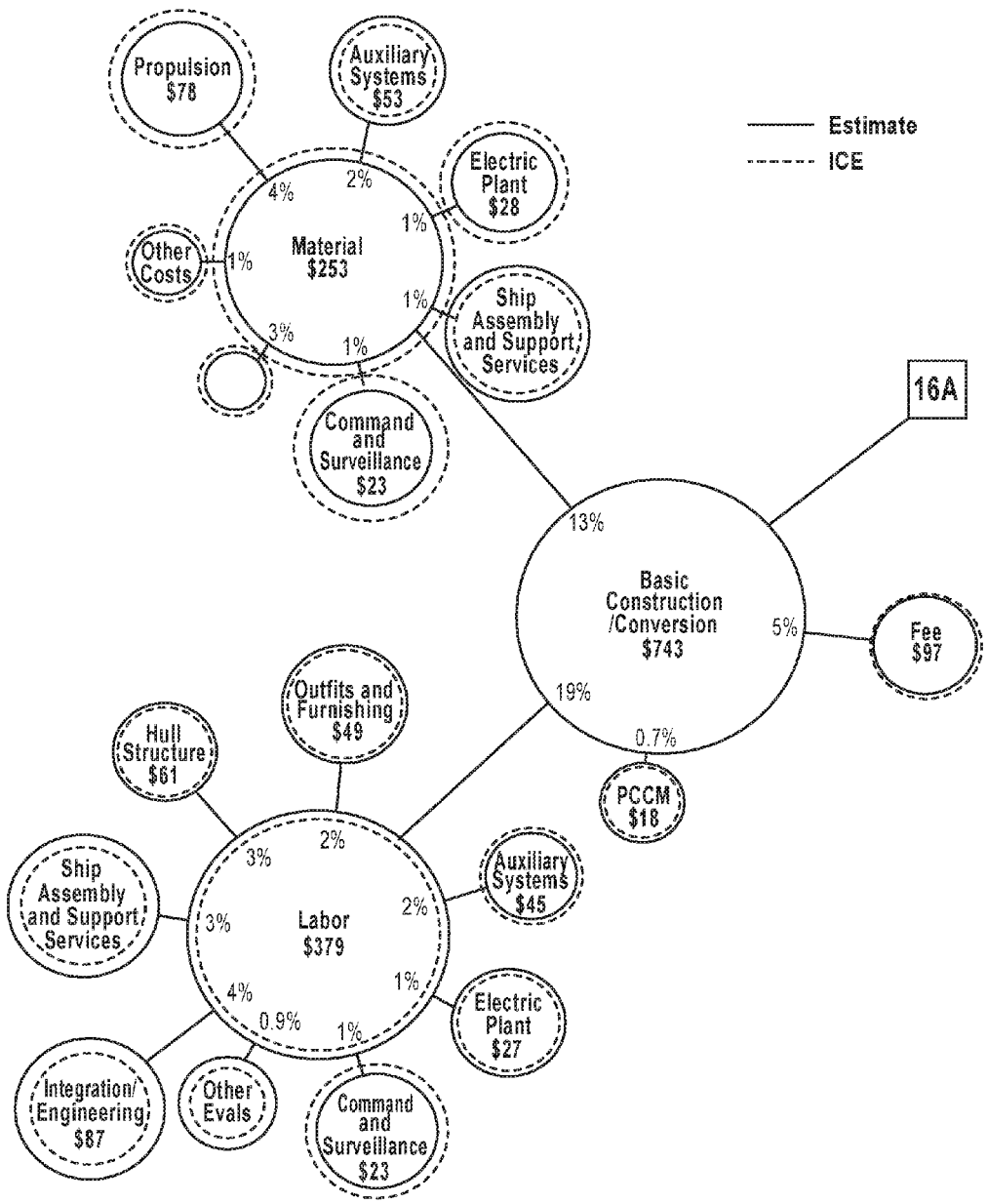
Figure 16C:
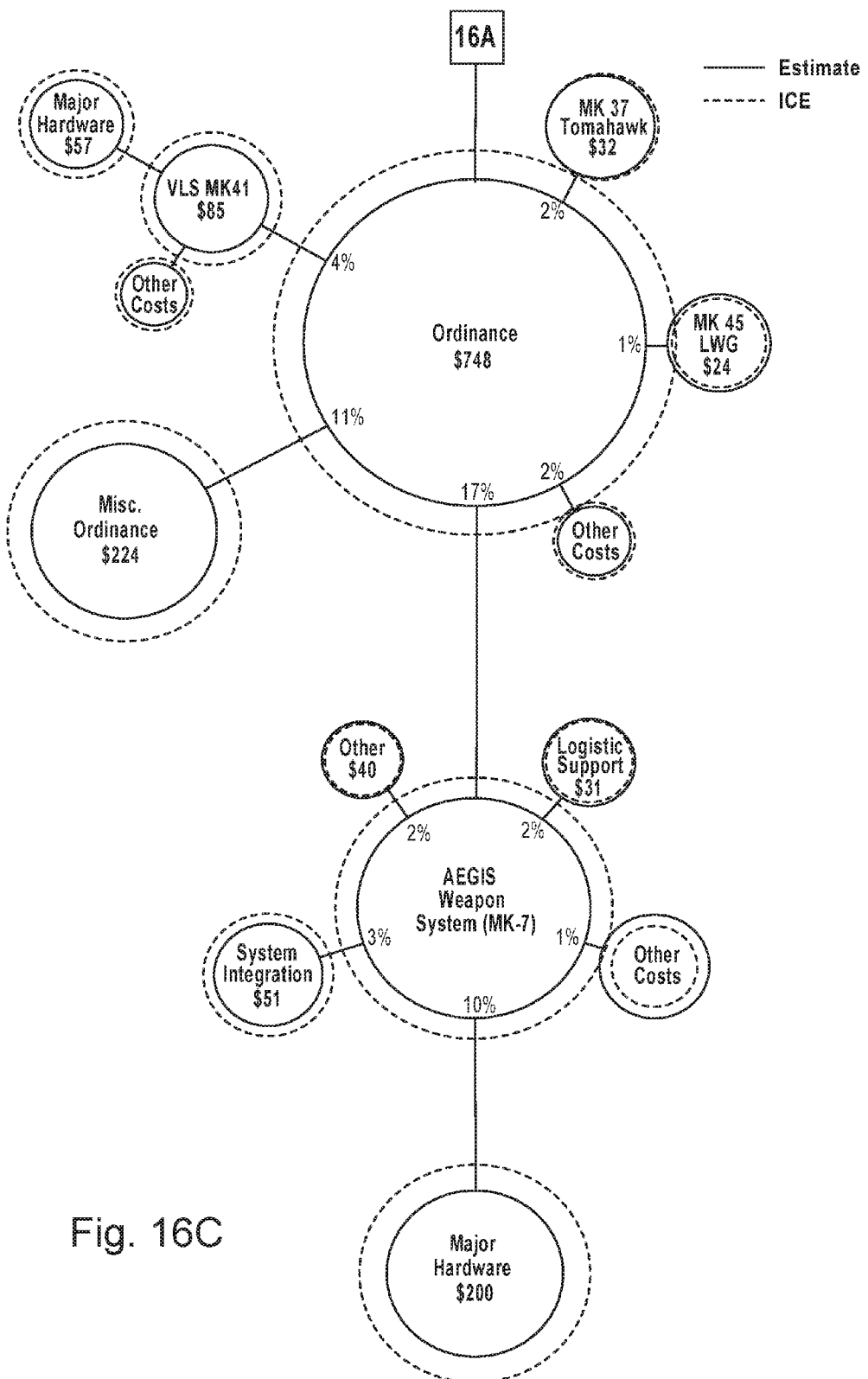

Suppose that the Initial Estimate for the Surface Combatant is complete, an Independent Cost Estimate (ICE) is also complete, and reconciliation among the cost estimates may need to take place. Fortunately, both estimates use the same hierarchical data structure. While analysts could compare the estimates side-by side, a closer look at the differences may be warranted. In this example, as both estimates use the same hierarchical data structure, the ICE may be laid on top of the Initial Estimate. As displayed in FIG. 16, the Initial Estimate chart remains unchanged from that illustrated in FIG. 13. A dashed-line representing the ICE may be added to the chart. Constructed in a similar manner as the estimate, the ICE circles may be sized by area and centered on the Initial Estimate circle. In this display, the charts' visual cues indicate where the discrepancies exist, but more importantly, where the significant differences exist.

Again, large circles may be indicative of important elements and are evident during visual inspection. Basic Construction/Conversion is a significant driver, but the ICE and the Initial Estimate are approximately equal, suggesting that a rigorous review of this element may be unnecessary. Ordnance is the second most significant driver. In this case, the ICE's estimate is considerably larger than the Initial Estimate. Very quickly, an analyst may identify that the AEGIS System's Major Hardware and Misc. Ordnance are two elements that may need close review. Insights such as these may quickly focus an analyst's energy on elements with meaningful payback.

Returning to the two estimates for Basic Construction/Conversion, though the estimates are very similar at the total level, when an analyst examines the child-level elements, differences may be observable. Relative to the Initial Estimate, the ICE is smaller for Labor cost and larger for Material cost. Further, differences exist among all of the Labor and Material child-level elements. All of these visually identifiable differences cancel each other, so that similar parent-level totals exist for Basic Construction/Conversion. The analyst may determine that further analysis is required and the visual cues from the chart may guide the analysis.

Figure 17A:
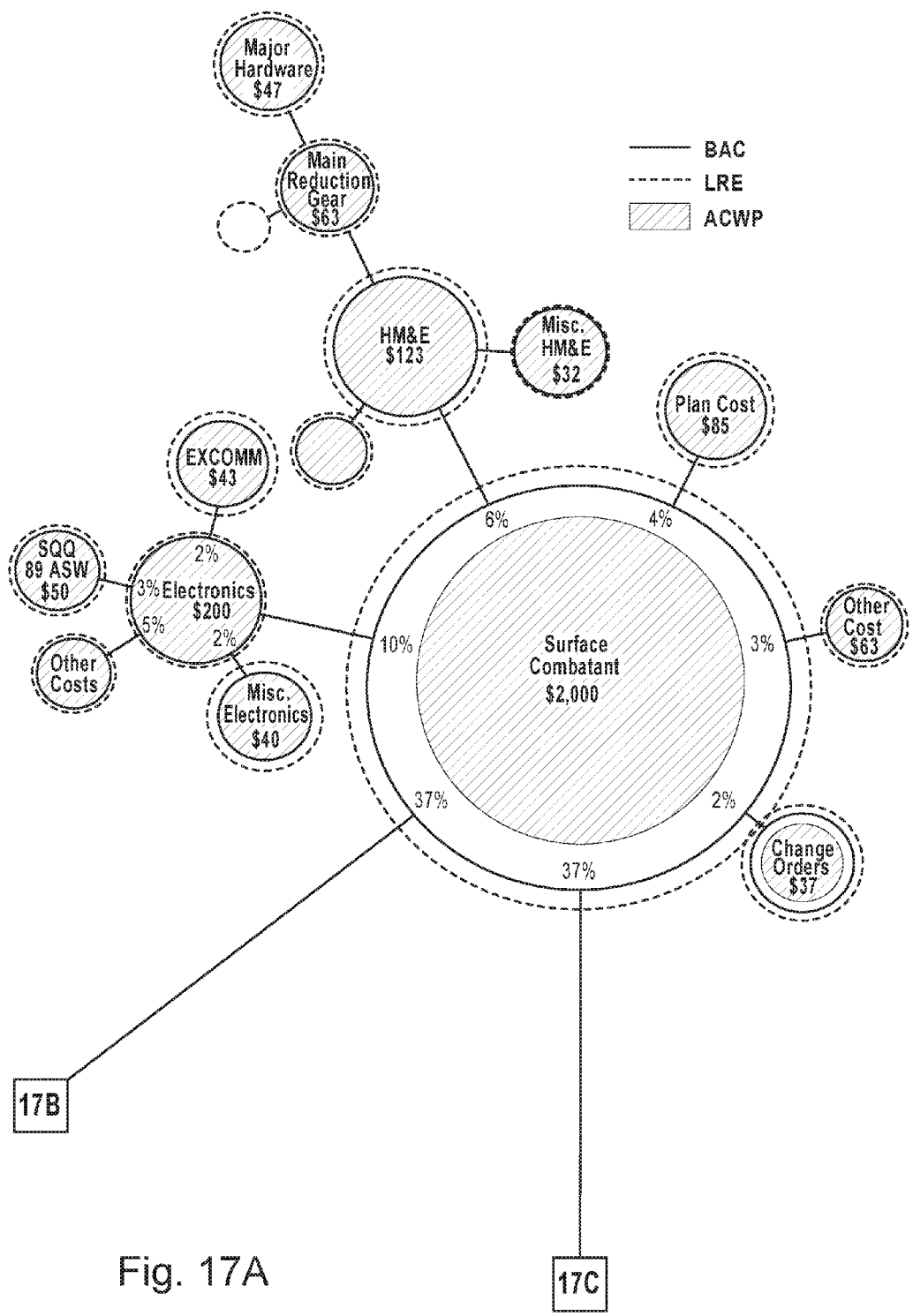
FIGS. 17A-C illustrates surface combatant with EVM data in accordance with an aspect of the present invention.
Figure 17B:
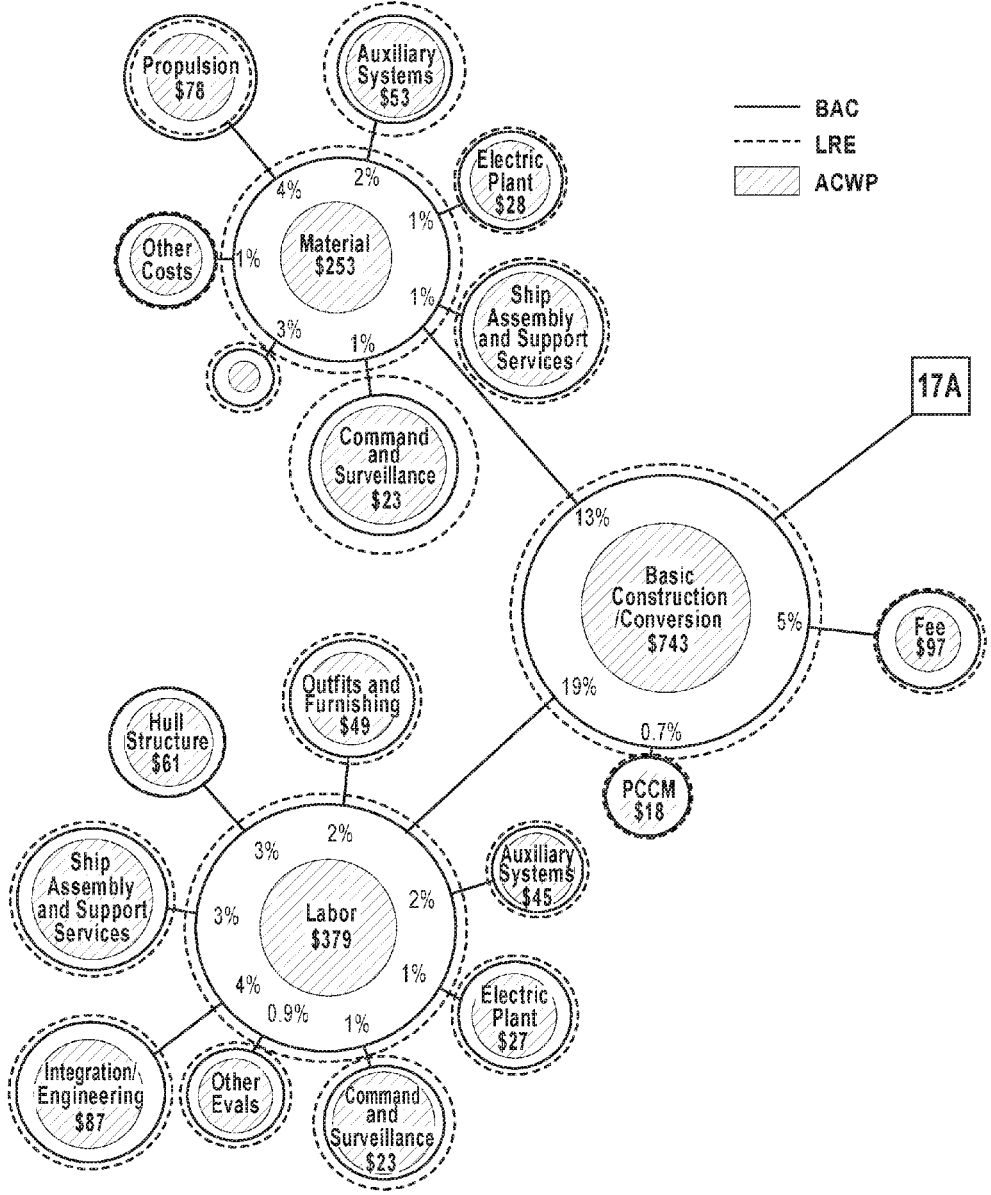
Figure 17C:
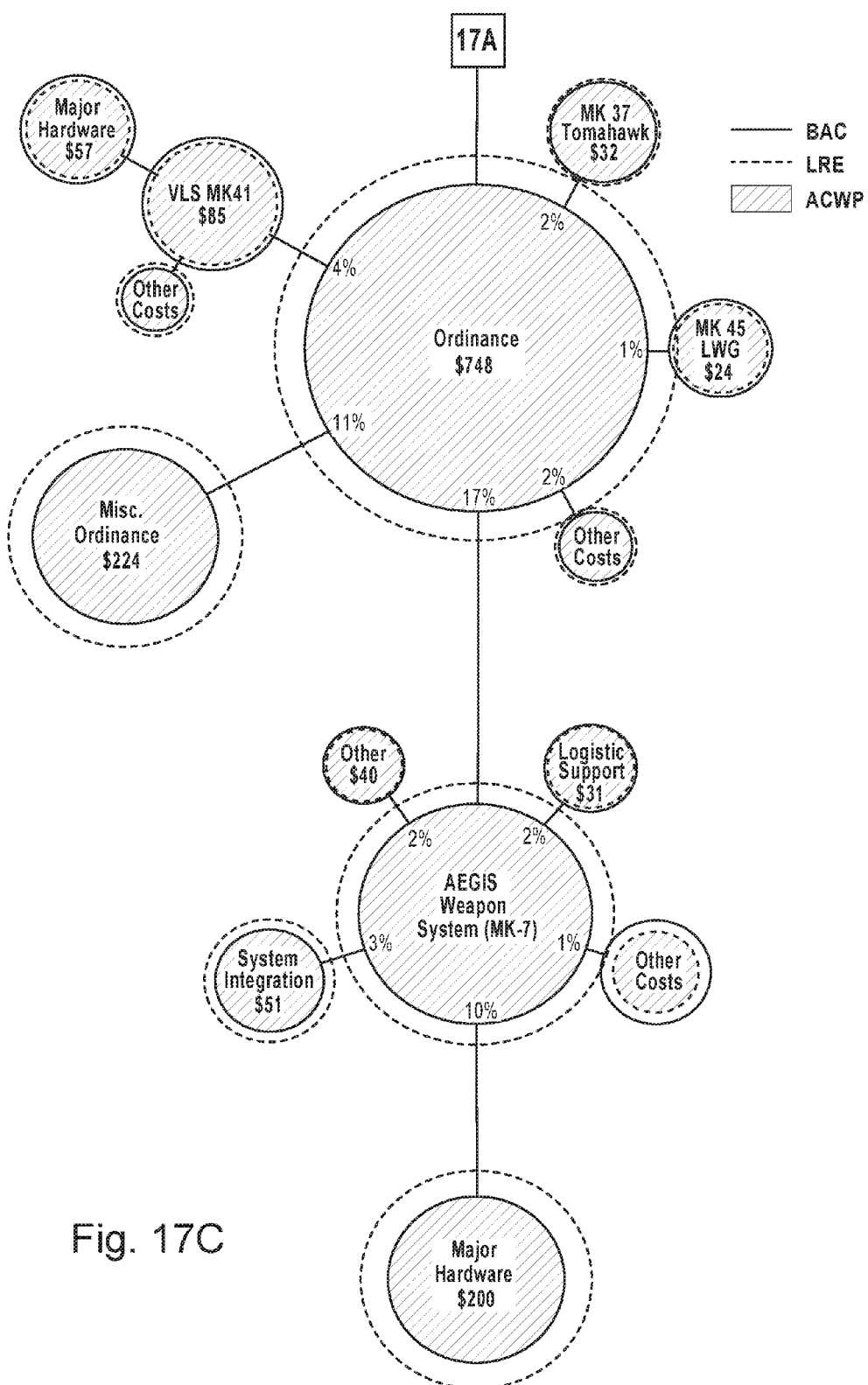

Moving forward in the life cycle, the analyst may examine the Surface Combatant while it is under construction. For example, assume that the values found in the Initial Estimate are the shipbuilder's Budget at Complete (BAC), so that the starting point is FIG. 13. In order to show multiple values on a single chart, yellow shading from the BAC elements may be removed, if necessary, and two additional sets of values: the shipbuilder's Latest Revised Estimate (LRE) and the Actual Cost of Work Performed (ACWP) may be added to the chart. The result is illustrated in FIG. 17. Please note that EVM charts may have a temporal nature, so for each update of EVM data, the chart of FIG. 17 may also be updated.

As for the ICE example, a dashed-line representing the LRE may be added to the chart. Constructed in a similar manner as the BAC, each LRE circle area may be calculated as a percentage of the total LRE circle area and each circle may be centered over its corresponding BAC circle. In this display, the charts' visual cues indicate that for every element the LRE is greater than the BAC. As with the ICE example, an analyst may also see where the most significant differences exist.

The ACWP may have a different color circle (e.g., a grey shaded circle) within each BAC circle. In addition, each ACWP circle area may be calculated as a percentage of the total ACWP circle area, and each circle may be centered over its corresponding BAC circle. While BAC and LRE might be relatively stable over time, every update of EVM data results in a new total ACWP. With time, each ACWP circle increases in diameter until the construction effort is complete.

The confluence of BAC, LRE, and ACWP circles may provide at least two useful insights to EVM performance. First, work sequencing may be visible. Those hierarchical data structure elements for which ACWP shading is a higher percentage of the corresponding BAC or the LRE circles are the most complete hierarchical data structure elements. For instance, the ratio of ACWP shading to BAC for the Ordnance-related effort exceeds the same ratio for the Basic Construction/Conversion-related effort; the chart suggests that the Ordnance effort precedes the Basic Construction/ Conversion effort.

The second insight may include that the ACWP circles indicate actual and potential overruns and under runs. For example, FIG. 17 indicates a significant overrun occurred for the Plan Cost element, i.e., its current ACWP is greater than its BAC. However, the parent-level for Plan Cost is the Surface Combatant total for which the ACWP is currently less than BAC. If Basic Construction/Conversion, the second most significant child of the Surface Combatant total, can remain within its BAC and not increase to its forecasted LRE, then it is possible that ACWP for the total element will remain less than its BAC and LRE.

Other EVM metrics beyond those discussed here might be displayed using the charts created in accordance with aspects of the present invention. For instance, the Budgeted Cost of Work Scheduled (BCWS) and the Budgeted Cost of Work Performed (BCWP) may be illustrated, or the Cost Variance, Variance at Completion, and Percent Complete may also be illustrated. Though the charts may not show trends over time, like a line graph, the charts may provide an analyst visual and quantitative insight into the current state of each individual hierarchical data structure element and of the total program.

With the ability to show multiple EVM metrics on the same chart, an analyst may quickly make comparisons, discern what is important, and determine where to focus effort. As previously observed, a significant overrun occurred for the Plan Cost element, but the Plan Cost element is nearly complete, so little, if any, improvement in its performance can be made. The current forecast for the Basic Construction/Conversion element is an overrun, too, but time still remains for improving its EVM metrics. Therefore, the charts in accordance with aspects of the present invention may allow an analyst to make insights such as these, to understand the inter-relationships that exist among the hierarchical data structure elements, and to make recommendations.

In an aspect, a time dimension may be added to the chart. For example, multiple charts created chronologically throughout the construction process may create a "flipbook" of the program showing the temporal behavior of the BAC, LRE, and ACWP. A flipbook may include one chart being shown after another in rapid succession, as if an individual was flipping through a stack of paper charts. The flipbook might also help an analyst observe budget shifting among the elements and compare ACWP progress at different stages of the construction process.

The above examples use a circle constructed with a dashed line or shaded circle to represent specific metrics. However, circles of this type may also be used to represent any number of alternate metrics that can be displayed in the same data structure. For example, an individual may construct a chart illustrating the square miles by continent and country. A dashed line may be added to show the population of each, and thus, allowing a viewer to see the population density.

One variation in accordance with aspects of the present invention may include using the line segment lengths on the chart to allow the visual display of another dimension, such as schedule, duration, start dates, end dates, or some other time-related phenomenon.

Aspects of the present invention may have many different possibilities and uses within the cost analysis arena and beyond. For example, the charts may be used to schedule analyses, and may be used for any other data that is hierarchal in nature. Thus, the charts may allow analysts to think in deeper and more thoughtful ways about the data, in order to make more robust and rigorous analyses.

Figure 19:
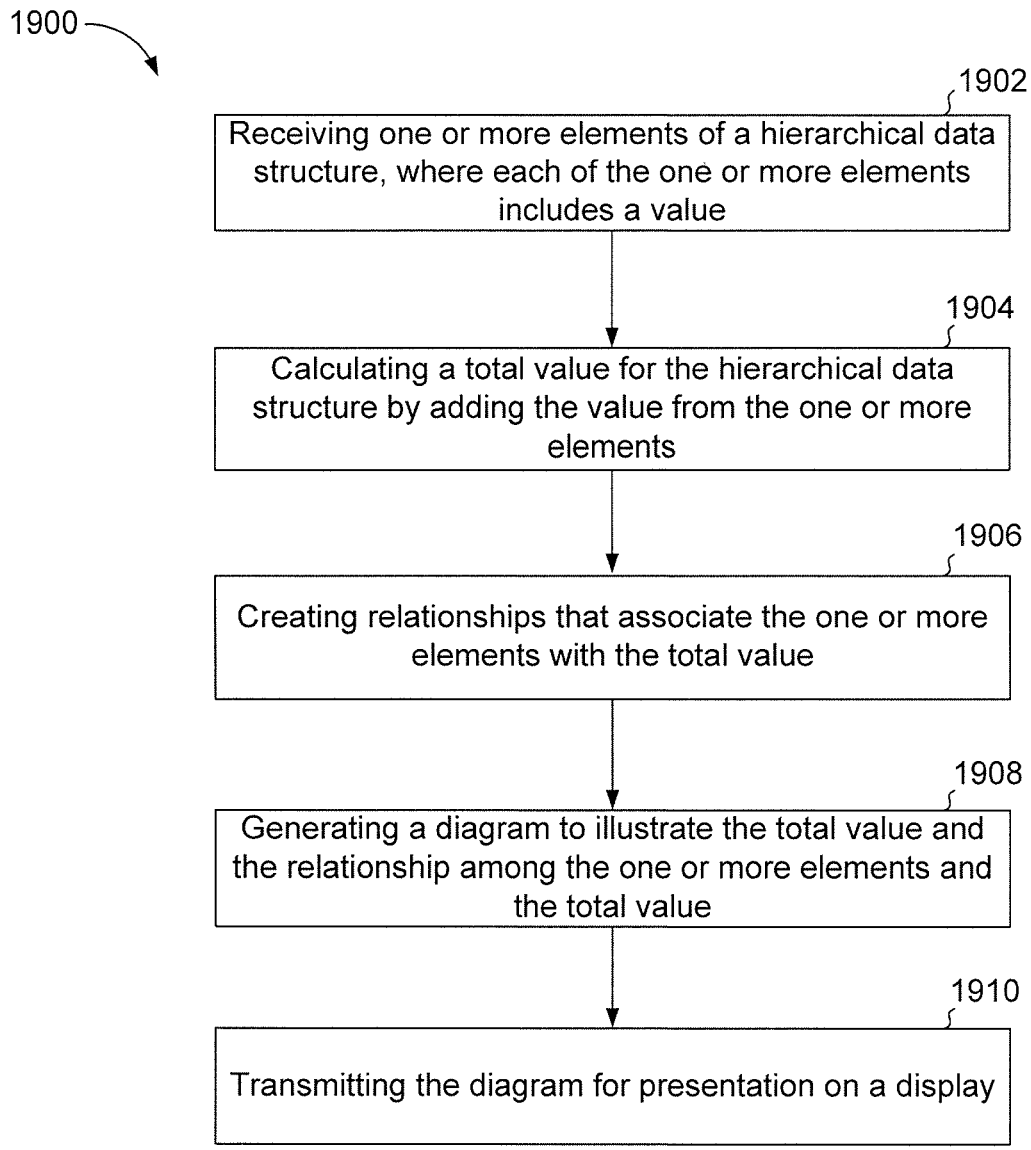
FIG. 19 illustrates an example method flow for creating a chart in accordance with an aspect of the present invention.

Referring now to FIG. 19, illustrated therein is a method 1900 for creating a chart in accordance with an aspect of the present invention. The method may include receiving one or more elements of a hierarchical data structure, where each of the one or more elements includes a value 1902. The value of the one or more elements may include quantifiable measure such as, but not limited to, costs, revenue, donations, people, distance, weight, molecules, wealth, taxes, height, mass, and energy. In an aspect, a computing device may receive the data for the hierarchical data structure and determine the value for each of the one or more elements included in the hierarchical data structure.

The method may also include calculating a total value for the hierarchical data structure by adding the value from the one or more elements 1904. For example, a processor may calculate the total value of the hierarchical data structure by adding the value of each element in the hierarchical data structure.

In addition, the method may include creating relationships that associate the one or more elements with the total value 1906. In an aspect, a processor may analyze the data in the hierarchical data structure and determine, for each hierarchical data structure element, a relationship among the hierarchical data structure element and the total value. For example, when the total value is compared to the Sun, each of the elements that are related to the total value may be compared to Planets.

The method may further include generating a diagram to illustrate the total value and the relationships among the one or more elements and the total value 1908. In an aspect, in the diagram each hierarchical data structure element may be contained in its own circle and the circles may connect with straight-line segments to show the relationships among the circles. The total value, i.e., the Sun, may be placed in the middle and its children, i.e., the Planets, may "orbit" the Sun. Lines drawn between the Sun and the Planets may illustrate relationships among the Sun and the Planets. In addition, to circles other shapes may used in the diagram, such as, but not limited to, triangles, squares, rectangles, pentagons, hexagons, and higher order shapes. In another aspect, the diagram may use three dimensions spheres, three dimensional triangles, cubes, and other three dimensional figures so that an analyst may view the diagram in three dimensions. For example, a processor may generate a diagram illustrating the total value and the relationship among the one or more elements and the total value.

The method may also include transmitting the diagram for presentation on a display 1910. For example, a processor may transmit the diagram for presentation on a display of a computing or printing device.

Figure 20A:
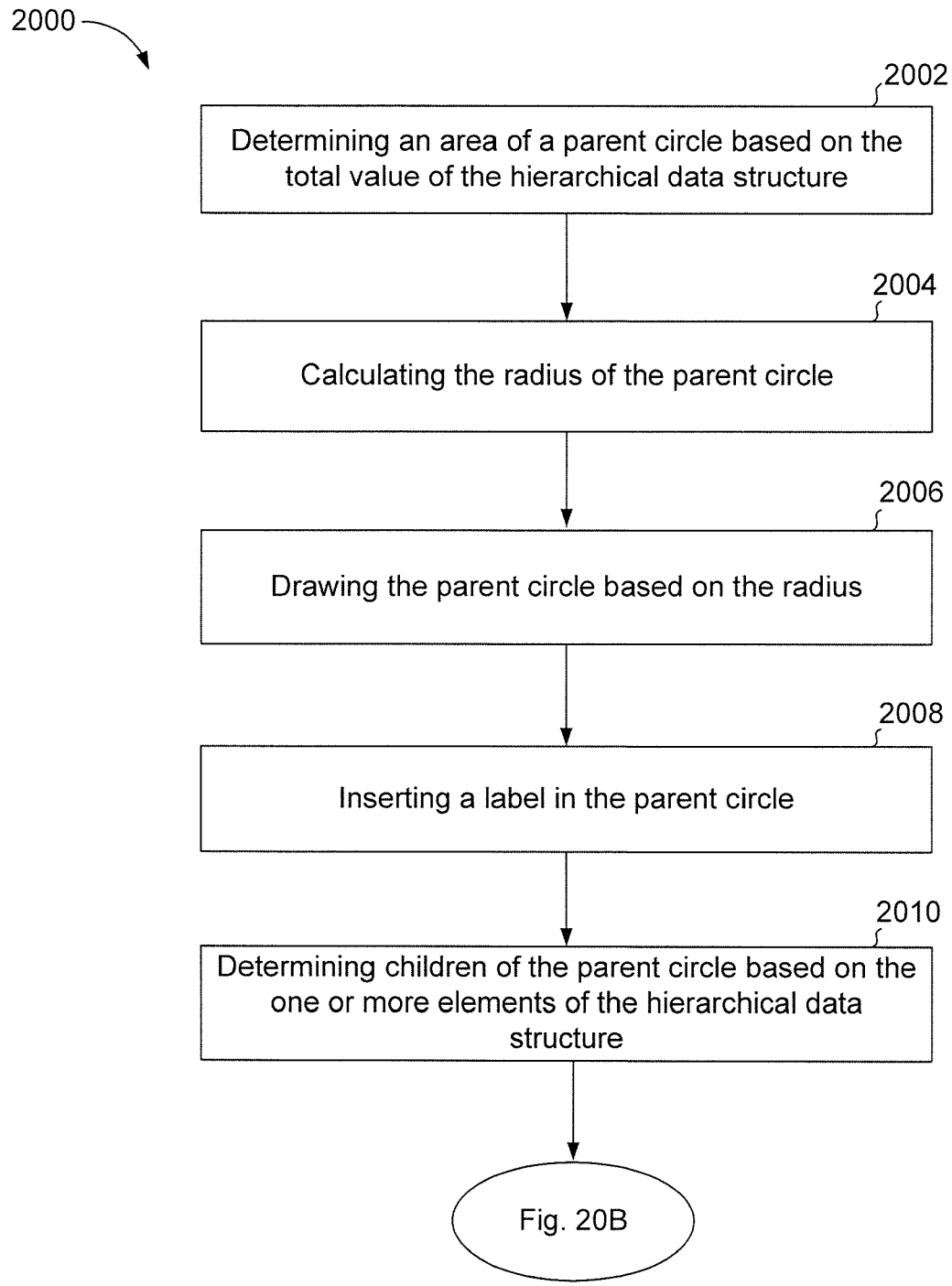
FIGS. 20A-C illustrate an example method flow for generating features of the chart in accordance with an aspect of the present invention.
Figure 20B:
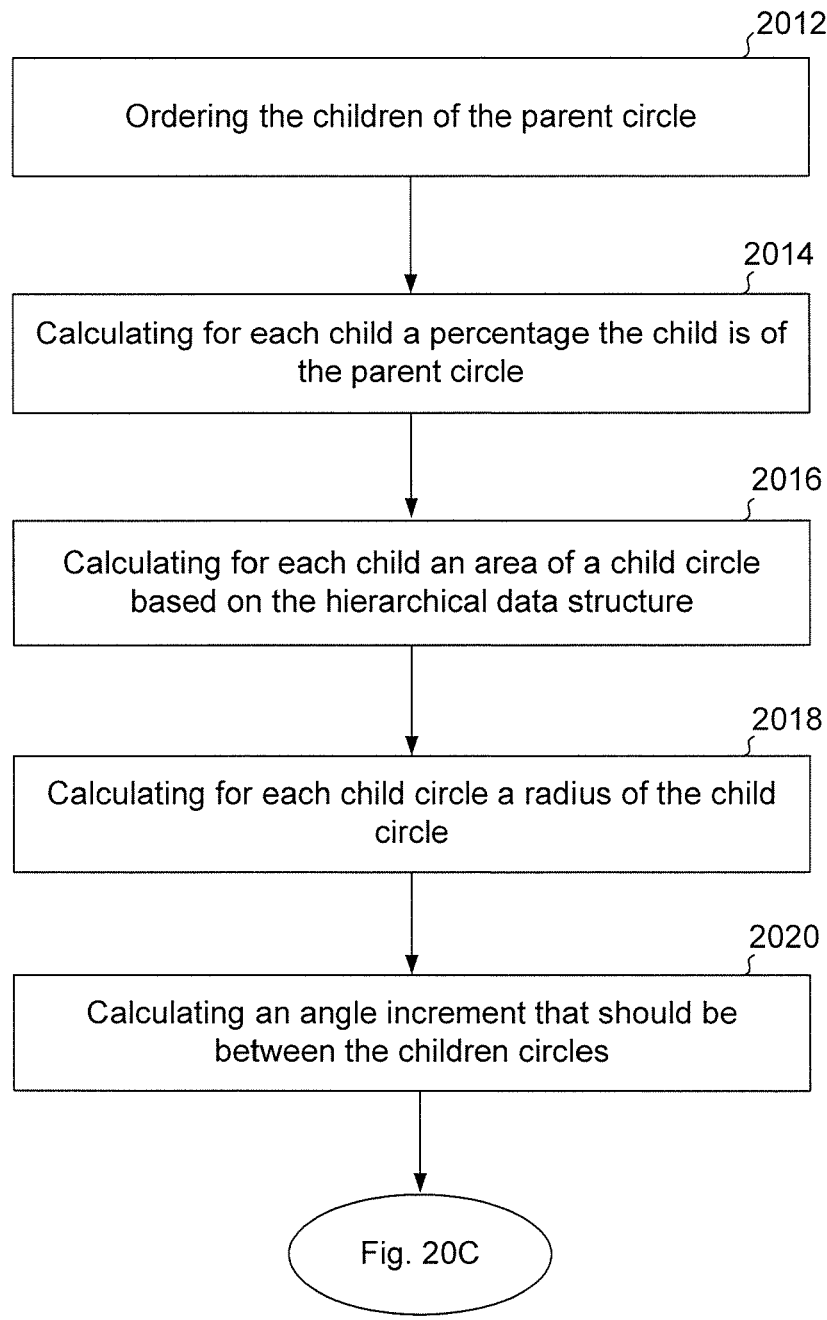
Figure 20C:
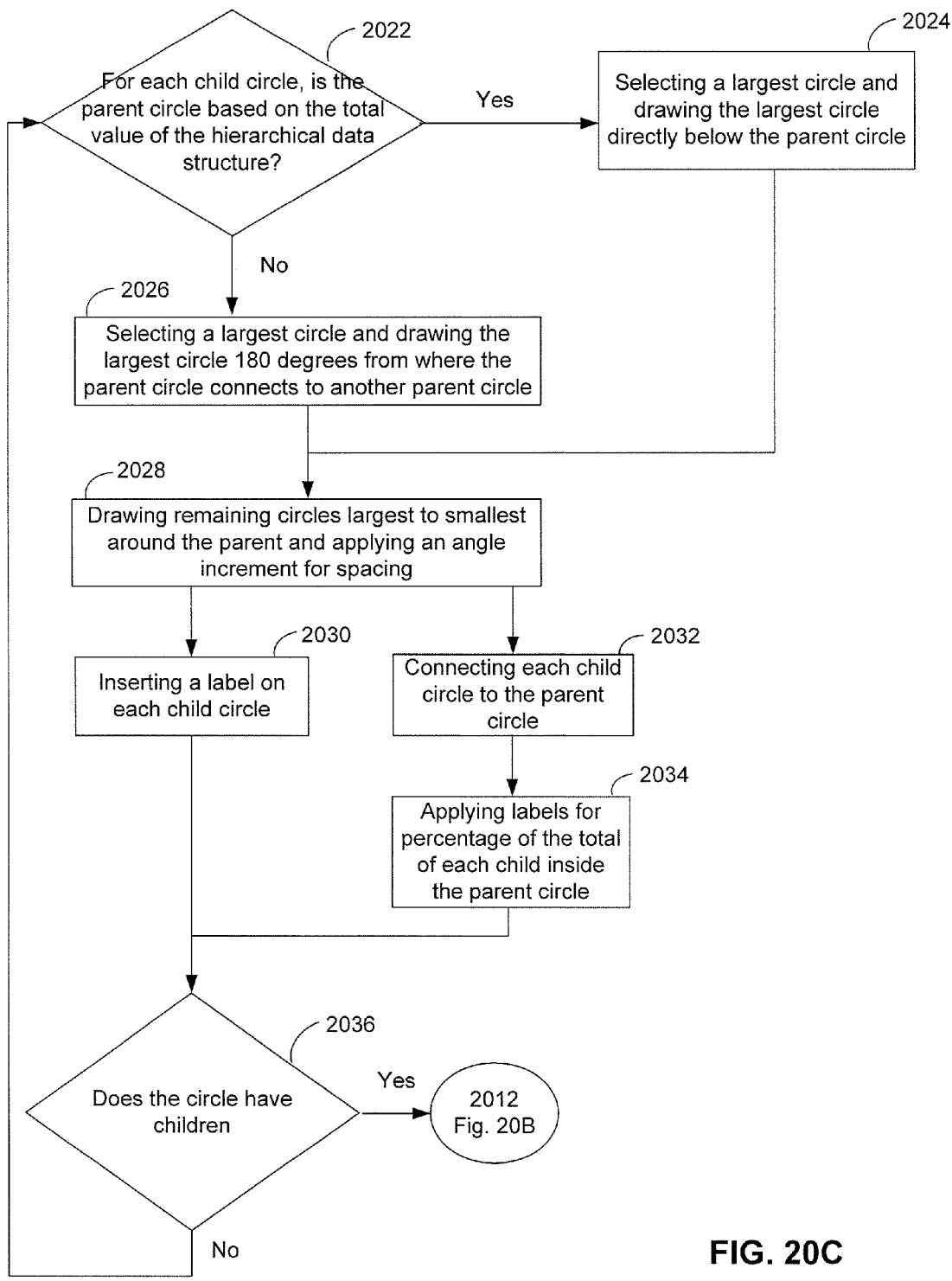

Referring now to FIGS. 20A-C, illustrated therein is a method 2000 for generating features of the chart in accordance with an aspect of the present invention. The method may include determining an area of a parent circle based on the total value of the hierarchical data structure 2002. The parent circle's area may equal the parent circle's value. For example, the parent circle's area may equal the sum of the child level areas. In an aspect, a processor in the computer system may calculate the area of the parent circle based on the total value of the hierarchical data structure.

The method may also include calculating the radius of the parent circle 2004. For example, a processor may calculate the radius of the parent circle.

The method may include drawing the parent circle based on the radius 2006. In an aspect, a processor may generate a drawing of the parent circle based on the calculated radius.

In addition, the method may include inserting a label in the parent circle 2008. The label may include, but is not limited to, the element name, the total value, and each child circle's percentage contribution to the total value. For example, a processor may generate a label and insert the label in the parent circle.

The method may also include determining children of the parent circle based on the one or more elements of the hierarchical data structure 2010. Children may include sub-elements that may be included in the parent. In an aspect, a processor may parse the data received for the hierarchical data structure and determine which sub-elements may be included in the parent.

The method may also include ordering the children of the parent circle 2012. In an aspect, the children may be ordered based on the value of the elements (e.g., higher value elements may be placed higher in the list relative to lower value elements). For example, a processor may determine the order of the children based on the value of each of the elements.

The method may also include calculating for each child a percentage the child is of the parent circle 2014. The percentage of each child-level element may be calculated by dividing the child-level value by the total value. In an aspect, a processor may calculate for each child a percentage the child is of the parent circle.

The method may further include calculating for each child, an area of a child circle based on the hierarchical data structure 2016. In an aspect, the area of the child circle may be calculated by multiplying the percentage of the child by the area of the parent circle. For example, a processor may calculate for each child, an area of the child circle.

The method may further include calculating for each child circle a radius of the child circle 2018. In an aspect, a processor may calculate each child circle's radius based on the area calculated for the child-level circle.

The method may also include calculating an angle increment that should be between the children circles 2020. The children circles may be evenly spaced around their parent circle based on the angle increment. In an aspect, a processor may calculate the angle increment by dividing 360° by the number of child circles or by using another algorithm or equation.

The method may further include determining for each child circle, whether the parent circle based on the total value of the hierarchical data structure 2022. In an aspect, a processor may determine whether the parent circle is based on the total value of the hierarchical data structure.

When the parent circle is based on the total value of the hierarchical data structure, the method may include selecting a largest child circle and drawing the largest child circle directly below the parent circle 2024. For example, a processor may draw the largest child circle directly below the parent circle.

When the parent circle is not based on the total value of the hierarchical data structure, the method may include selecting a largest child circle and drawing the largest child circle 180 degrees from where the parent circle connects to another parent circle 2026. For example, a processor may draw the most significant child-level hierarchical data structure element at 180° from the parent-level value.

The method may further include drawing the remaining circles largest to smallest around the parent and applying an angle increment for spacing 2028. For example, the remaining circles may be evenly spaced based on an angle increment around their parent circle in a decreasing order relative to their size in a clockwise manner. In addition, the remaining circles may be placed in a counter clockwise manner around their parent circle. For example, a processor may draw the remaining children circles around the parent circle.

The method may also include connecting each child circle to the parent circle 2032 and applying labels for percentage of the total of each child inside the parent circle 2034. For example, a scaled straight-line segment may connect each child-level value with the parent and as the child-level circles get smaller, the line segments may decrease so that the children circles are closer and closer to the parent circle. In an aspect, a processor may connect each child circle to the parent circle and apply labels for the percentage of the total of each child inside the parent circle.

The method may also include inserting a label on each child circle 2030. The label may include, but is not limited to, the element name, and the value of the element. In an aspect, a processor may insert a label on each child circle.

The method may also include determining whether the circle has children 2036. For example, a processor may determine whether the circle has children.

When the circle does have children, the method may proceed to 2012. When the circle does not have children, the method may proceed to 2022. Once the characteristics of every circle is calculated and inserted into the chart, the method may end.

The method may optionally include presenting multiple charts side-by-side. For example, a processor may present two charts side-by-side on single screen view of a display. Multiple side-by-side charts may enable detailed comparisons among the side-by-side charts. For example, the value differences among the variants may be easily recognizable. In addition, a dashed line or shaded circle may be added so as to add other dimensions.

The method may also optionally include presenting charts created throughout the construction process chronologically. For example, a processor may present the charts in a "flipbook" presentation showing the temporal behavior of the elements over time. A flipbook may include one chart being shown after another in rapid succession, as if an individual was flipping through a stack of the charts. As such, an analyst may observe changes among the elements and compare progress at different stages of a process.

Figure 21:
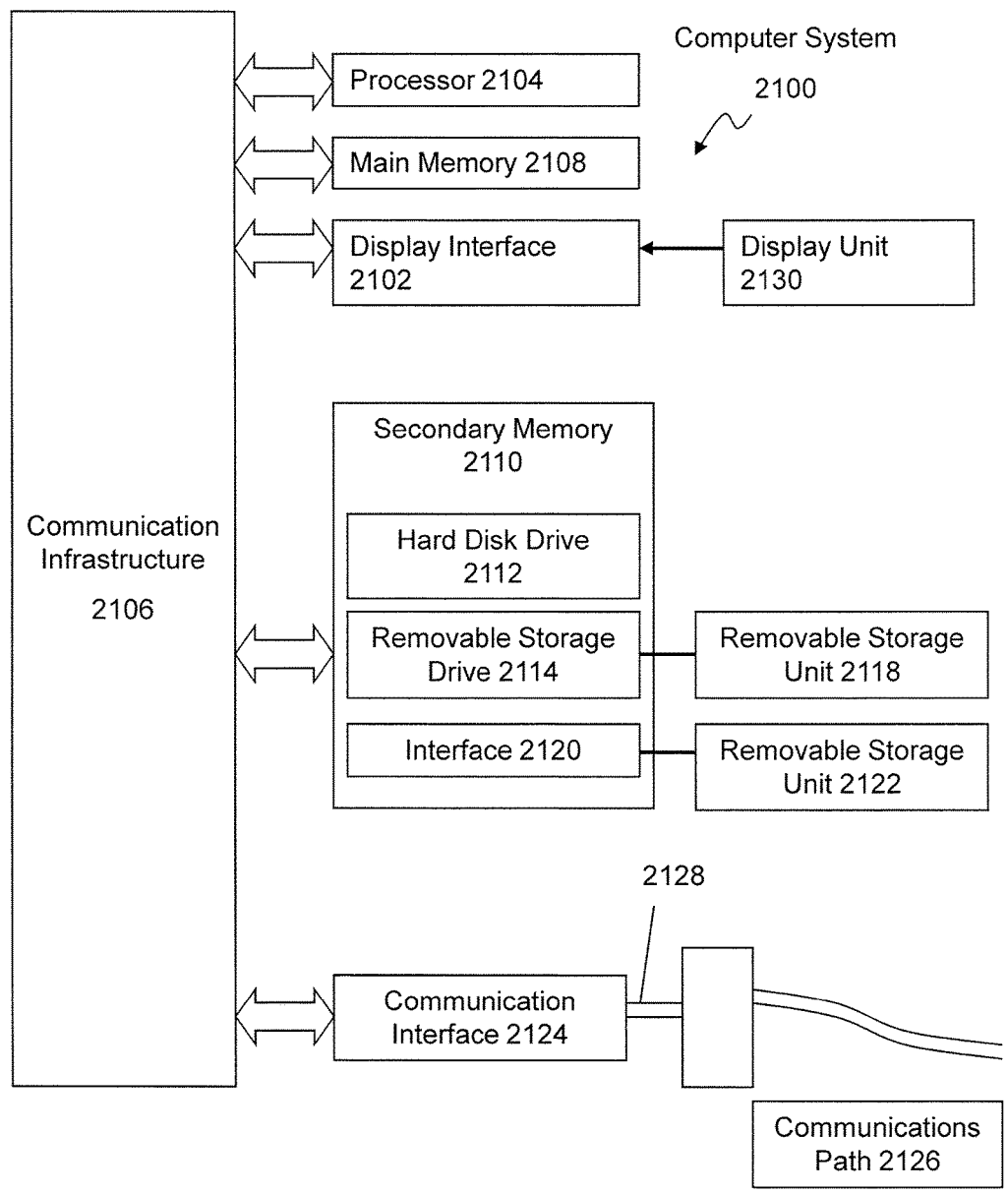
FIG. 21 illustrates various features of an example computer system for use in conjunction with aspects of the present invention.

Aspects of the present invention may be implemented using hardware, software, or a combination thereof and may be implemented in one or more computer systems or other processing systems. In an aspect of the present invention, features are directed toward one or more computer systems capable of carrying out the functionality described herein. An example of such a computer system 2100 is illustrated in FIG. 21.

Computer system 2100 includes one or more processors, such as processor 2104. The processor 2104 is connected to a communication infrastructure 2106 (e.g., a communications bus, cross-over bar, or network). Various software aspects are described in terms of this exemplary computer system. After reading this description, it will become apparent to a person skilled in the relevant art(s) how to implement aspects of the invention using other computer systems and/or architectures.

Computer system 2100 can include a display interface 2102 that forwards graphics, text, and other data from the communication infrastructure 2106 (or from a frame buffer not shown) for display on a display unit 2130. Computer system 2100 also includes a main memory 2108, preferably random access memory (RAM), and may also include a secondary memory 2110. The secondary memory 2110 may include, for example, a hard disk drive 2112 and/or a removable storage drive 2114, representing a floppy disk drive, a magnetic tape drive, an optical disk drive, a universal serial bus (USB) flash drive, etc. The removable storage drive 2114 reads from and/or writes to a removable storage unit 2118 in a well-known manner. Removable storage unit 2118 represents a floppy disk, magnetic tape, optical disk, USB flash drive etc., which is read by and written to removable storage drive 2114. As will be appreciated, the removable storage unit 2118 includes a computer usable storage medium having stored therein computer software and/or data.

Alternative aspects of the present invention may include secondary memory 2110 and may include other similar devices for allowing computer programs or other instructions to be loaded into computer system 2100. Such devices may include, for example, a removable storage unit 2122 and an interface 2120. Examples of such may include a program cartridge and cartridge interface (such as that found in video game devices), a removable memory chip (such as an erasable programmable read only memory (EPROM), or programmable read only memory (PROM)) and associated socket, and other removable storage units 2122 and interfaces 2120, which allow software and data to be transferred from the removable storage unit 2122 to computer system 2100.

Computer system 2100 may also include a communications interface 2124. Communications interface 2124 allows software and data to be transferred between computer system 2100 and external devices. Examples of communications interface 2124 may include a modem, a network interface (such as an Ethernet card), a communications port, a Personal Computer Memory Card International Association (PCMCIA) slot and card, etc. Software and data transferred via communications interface 2124 are in the form of signals 2128, which may be electronic, electromagnetic, optical or other signals capable of being received by communications interface 2124. These signals 2128 are provided to communications interface 2124 via a communications path (e.g., channel) 2126. This path 2126 carries signals 2128 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 2114, a hard disk installed in hard disk drive 2112, and signals 2128. These computer program products provide software to the computer system 2100. Aspects of the invention are directed to such computer program products.

Computer programs (also referred to as computer control logic) are stored in main memory 2108 and/or secondary memory 2110. Computer programs may also be received via communications interface 2124. Such computer programs, when executed, enable the computer system 2100 to perform the features in accordance with aspects of the present invention, as discussed herein. In particular, the computer programs, when executed, enable the processor 2104 to perform the features in accordance with aspects of the present invention. Accordingly, such computer programs represent controllers of the computer system 2100.

In an aspect of the present invention that is implemented using software, the software may be stored in a computer program product and loaded into computer system 2100 using removable storage drive 2114, hard drive 2112, or communications interface 2120. The control logic (software), when executed by the processor 2104, causes the processor 2104 to perform the functions described herein. In another aspect of the present invention, the system is implemented primarily in hardware using, for example, hardware components, such as application specific integrated circuits (ASICs). Implementation of the hardware state machine so as to perform the functions described herein will be apparent to persons skilled in the relevant art(s).

In yet another aspect of the present invention, features thereof is implemented using a combination of both hardware and software.

Figure 22:
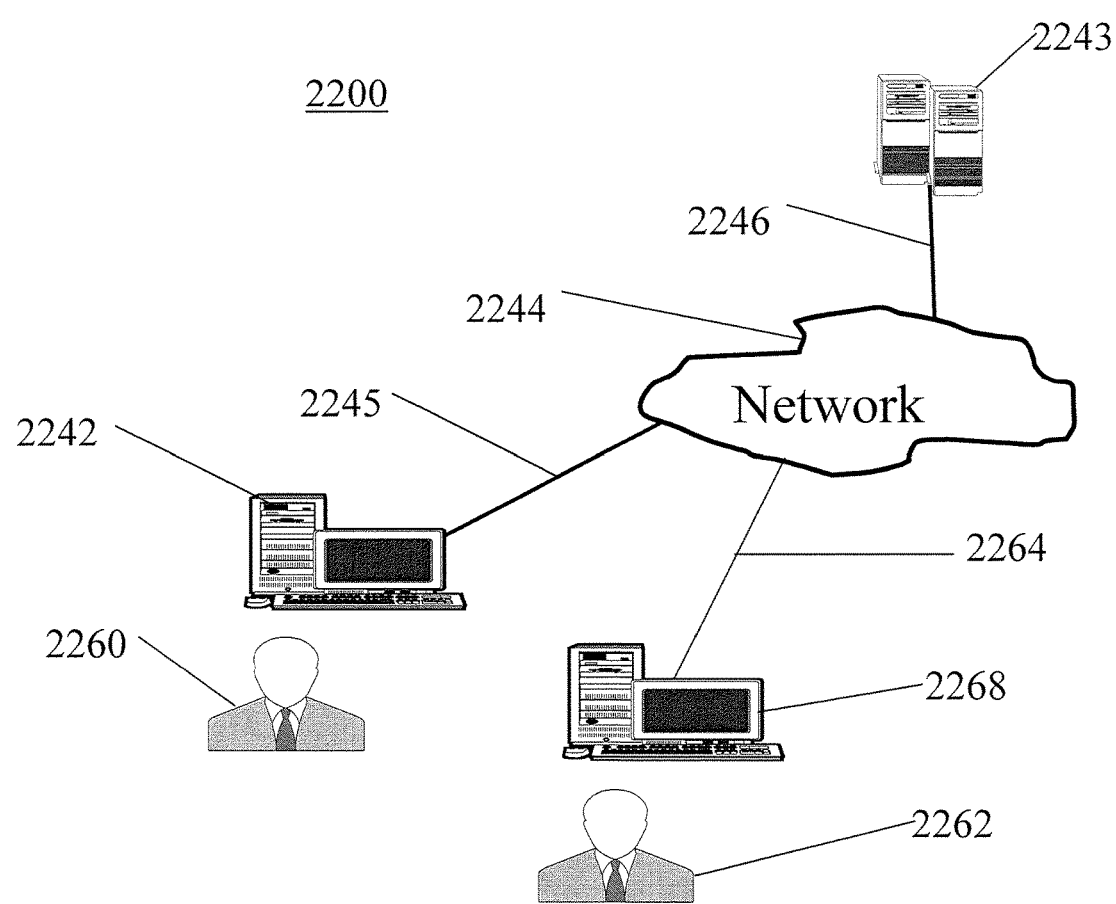
FIG. 22 illustrates an exemplary system diagram of various hardware components and other features for use in accordance with aspects of the present invention.

FIG. 22 shows a communication system 2200 usable in accordance with aspects of the present invention. The communication system 2200 includes one or more accessors 2260, 2262 (also referred to interchangeably herein as one or more "users") and one or more terminals 2242, 2266. In one aspect of the present invention, data for use is, for example, input and/or accessed by accessors 2260, 2264 via terminals 2242, 2268, such as personal computers (PCs), minicomputers, mainframe computers, microcomputers, telephonic devices, or wireless devices, such as personal digital assistants ("PDAs") or a hand-held wireless devices coupled to a server 2243, such as a PC, minicomputer, mainframe computer, microcomputer, or other device having a processor and a repository for data and/or connection to a repository for data, via, for example, a network 2244, such as the Internet or an intranet, and couplings 2245, 2246, 2264. The couplings 2245, 2246, 2264 include, for example, wired, wireless, or fiberoptic links.

While aspects of the present invention have been described in connection with examples thereof, it will be understood by those skilled in the art that variations and modifications of the aspects of the present invention described above may be made without departing from the scope hereof. Other aspects will be apparent to those skilled in the art from a consideration of the specification or from a practice in accordance with aspects of the invention disclosed herein.

The invention claimed is:

1. A method for creating an output graphic using a processing device, the method comprising:
   receiving one or more elements of a hierarchical data structure, wherein each of the one or more elements includes a value;
   calculating, via the processing device, a total value for the hierarchical data structure by adding the value from the one or more elements;
   creating, via the processing device, relationships that associate the one more elements with the total value;
   generating, via the processing device, a diagram to illustrate the total value and the relationships among the one or more elements and the total value; and
   the processing device transmitting the diagram for presentation on a display,
   wherein generating the diagram further includes:
      drawing a shape for each of the one or more elements of the hierarchical data structure;
      determining an area of a parent shape based on the total value of the hierarchical data structure;
      calculating a measurement of the parent shape;
      drawing a parent shape based on the measurement;
      inserting a parent shape label in the parent shape;
      determining children of the parent shape based on the one or more elements of the hierarchical data structure;
      calculating for each child of the parent shape a percentage the child is of the total value of the hierarchical data structure;
      calculating for each child an area of the child shape based on the hierarchical data structure and a measurement for the child shape;
      calculating an angle increment for spacing the children shapes around the parent shape;
      selecting a largest shape of the children shapes and drawing the largest shape directly adjacent to the parent shape; and
      drawing remaining children shapes largest to smallest around the parent and using the angle increment for spacing among the remaining shapes.

2. The method of claim 1, wherein the shape has a two dimensional or a three dimensional appearance.

3. The method of claim 1, wherein the shape comprises at least one selected from a group consisting of a circle, a triangle, a square, a rectangle, a pentagon, and a hexagon.

4. The method of claim 1, further comprising:
   connecting each child shape to the parent shape with a line;
   inserting a child shape label in each child shape; and
   applying the percentage the child is of the total value of the hierarchal data structure to the parent shape label.

5. The method of claim 4, further comprising:
   determining for each child shape, whether the child shape has any children based on the one or more elements of the hierarchical data structure; and
   when the child shape does have children:
      calculating for each child of the child shape a percentage the child is of the total value of the hierarchical data structure;
      calculating for each child an area of the child shape based on the hierarchical data structure and a measurement for the child shape;
      calculating an angle increment for spacing the children shapes around the child shape;
      selecting a largest shape of the children shapes and drawing the largest shape 180 degrees from where the parent shape connects to the child shape; and
      drawing remaining children shapes largest to smallest around the child and using the angle increment for spacing among the remaining shapes.

6. The method of claim 1, further comprising:
   receiving a second hierarchical data structure with one or more elements;
   generating a second diagram illustrating a total value of the hierarchical data structure and relationships among the one or more elements of the second hierarchical data structure and the value
   transmitting the second diagram for presentation next to the diagram on the display.

7. The method of claim 1, further comprising:
   receiving a second hierarchical data structure with one or more elements;
   generating a second diagram illustrating a total value of the hierarchical data structure and relationships among the one or more elements of the second hierarchical data structure and the value;
   transmitting the second diagram for presentation on the display,
   wherein the second diagram illustrates the one or more elements of the second hierarchical data structure using dashed or shaded shapes, and
   wherein the second diagram is superimposedly viewable with the diagram.

8. The method of claim 7, wherein the second hierarchical data structure and the hierarchical data structure have a similar structure.

9. The method of claim 1, wherein a plurality of diagrams are generated over a period of time for the hierarchical data structure; and
   the processing device transmits the plurality of diagrams for presentation chronologically on the display.

10. A system for creating an output graphic using a processing device, the system comprising:
    a component operable to receive one or more elements of a hierarchical data structure, wherein each of the one or more elements includes a value;
    a component operable to calculate a total value for the hierarchical data structure by adding the value from the one or more elements;
    a component operable to create relationships that associate the one more elements with the total value;

a component operable to generate a diagram to illustrate the total value and the relationships among the one or more elements and the total value; and a component operable to transmit the diagram for presentation on a display or printing device, wherein the component operable to generate a diagram is further operable to:
draw a shape for each of the one or more elements of the hierarchical data structure;
determine an area of a parent shape based on the total value of the hierarchical data structure;
calculate a measurement of the parent shape;
draw a parent shape based on the measurement;
insert a parent shape label in the parent shape;
determine children of the parent shape based on the one or more elements of the hierarchical data structure;
calculate for each child of the parent shape a percentage the child is of the total value of the hierarchical data structure;
calculate for each child an area of the child shape based on the hierarchical data structure and a measurement for the child shape;
calculate an angle increment for spacing the children shapes around the parent shape;
select a largest shape of the children shapes and draw the largest shape adjacent to the parent shape; and
draw remaining children shapes largest to smallest around the parent and to use the angle increment for spacing among the remaining shapes.

11. The system of claim 10, wherein the shape has a two dimensional or a three dimensional appearance.

12. The system of claim 10, wherein the shape comprises at least one selected from a group consisting of a circle, a triangle, a square, a rectangle, a pentagon, and a hexagon.

13. The system of claim 10, further comprising:
a component operable to connect each child shape to the parent shape with a line;
a component operable to insert a child shape label in each child shape; and
a component operable to apply the percentage the child is of the total value of the hierarchal data structure to the parent shape label.

14. The system of claim 13, further comprising:
a component operable to determine for each child shape, whether the child shape has any children based on the one or more elements of the hierarchical data structure.

15. The system of claim 14, wherein when the child shape does have children, the system further comprising:
a component operable to calculate for each child of the child shapes a percentage the child is of the total value of the hierarchical data structure;
a component operable to calculate for each child an area of the child shape based on the hierarchical data structure and a measurement for the child shape;
a component operable to calculate an angle increment for spacing the children shapes around the child shape;
a component operable to select a largest shape of the children shapes and to draw the largest shape 180 degrees from where the parent shape connects to the child shape; and
a component operable to draw remaining children shapes largest to smallest around the child and to use the angle increment for spacing among the remaining shapes.

16. A computer program product comprising a non-transitory computer usable medium having control logic stored therein for causing a computer to create an output graphic, the control logic comprising:
at least one instruction for causing a computer to receive one or more elements of a hierarchical data structure, wherein each of the one or more elements includes a value;
at least one instruction for causing the computer to calculate a total value for the hierarchical data structure by adding the value from the one or more elements;
at least one instruction for causing the computer to create relationships that associate the one more elements with the total value;
at least one instruction for causing the computer to generate a diagram to illustrate the total value and the relationships among the one or more elements and the total value; and at least one instruction for causing the computer to transmit the diagram for presentation on a display or a printer,
wherein the at least one instruction for causing the computer to generate a diagram further includes:
at least one instruction for causing the computer to draw a shape for each of the one or more elements of the hierarchical data structure;
at least one instruction for causing the computer to determine an area of a parent shape based on the total value of the hierarchical data structure;
at least one instruction for causing the computer to calculate a measurement of the parent shape;
at least one instruction for causing the computer to draw a parent shape based on the measurement;
at least one instruction for causing the computer to insert a parent shape label in the parent shape;
at least one instruction for causing the computer to determine children of the parent shape based on the one or more elements of the hierarchical data structure;
at least one instruction for causing the computer to calculate for each child of the parent shape a percentage the child is of the total value of the hierarchical data structure;
at least one instruction for causing the computer to calculate for each child an area of the child shape based on the hierarchical data structure and a measurement for the child shape;
at least one instruction for causing the computer to calculate an angle increment for spacing the children shapes around the parent shape;
at least one instruction for causing the computer to select a largest shape of the children shapes and draw the largest shape adjacent to the parent shape; and
at least one instruction for causing the computer to draw remaining children shapes largest to smallest around the parent and to use the angle increment for spacing among the remaining shapes.

17. The computer program product of claim 16, wherein the shape has a two dimensional or a three dimensional appearance.

18. The computer program product of claim 16, wherein the shape comprises at least one selected from a group consisting of a circle, a triangle, a square, a rectangle, a pentagon, and a hexagon.

19. The method of claim 8, wherein the second hierarchical data structure and the hierarchical data structure have different values.

* * * * *